United States Patent
Kimura

(10) Patent No.: US 6,650,309 B1
(45) Date of Patent: Nov. 18, 2003

(54) LIGHT MODULATION ELEMENT, ARRAY-TYPE LIGHT MODULATION ELEMENT, DRIVE METHOD THEREOF, AND FLAT-PANEL DISPLAY UNIT

(75) Inventor: Koichi Kimura, Shizuoka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/484,279

(22) Filed: Jan. 18, 2000

(30) Foreign Application Priority Data

Jan. 20, 1999 (JP) .......................... 11-012034

(51) Int. Cl.⁷ .................... G09G 3/34; G09G 3/00; G09G 3/20
(52) U.S. Cl. ..................... 345/84; 345/55; 345/31; 345/108
(58) Field of Search ................... 345/108, 31, 85, 345/84, 86; 350/269; 361/301

(56) References Cited

U.S. PATENT DOCUMENTS

| | | | | |
|---|---|---|---|---|
| 3,553,364 A | * | 1/1971 | Lee | 350/269 |
| 4,065,677 A | * | 12/1977 | Micheron et al. | 307/112 |
| 4,805,038 A | * | 2/1989 | Seligson | 350/269 |
| 4,891,635 A | * | 1/1990 | Hata | 350/269 |
| 4,949,227 A | * | 8/1990 | Finch et al. | 362/61 |
| 5,062,689 A | | 11/1991 | Koehler | |
| 5,231,559 A | * | 7/1993 | Kalt et al. | 361/301 |
| 5,459,610 A | * | 10/1995 | Bloom et al. | 345/108 |
| 5,519,240 A | | 5/1996 | Suzuki | |
| 5,638,084 A | * | 6/1997 | Kalt | 345/31 |
| 5,781,331 A | | 7/1998 | Carr et al. | |
| 6,075,239 A | * | 6/2000 | Aksyuk et al. | 250/229 |
| 6,317,108 B1 | * | 11/2001 | Kalt | 345/85 |
| 6,389,189 B1 | * | 5/2002 | Edwards et al. | 385/18 |

FOREIGN PATENT DOCUMENTS

WO    WO 98/19201 A    5/1998

\* cited by examiner

*Primary Examiner*—Steven Saras
*Assistant Examiner*—Alecia D. Nelson
(74) *Attorney, Agent, or Firm*—Sughrue Mion, PLLC

(57) ABSTRACT

A light modulation element for performing electromechanical operation of generating a first electromechanical force for a needle 15 for displacing the needle, thereby changing a transmission factor of light. The light modulation element has drive means for generating or canceling a second electromechanical force 25 for the needle in a vertical direction different from the horizontal direction of the first electromechanical force 29 and holding or canceling the displacement state of the needle, so that active and stable matrix drive is provided by the first and second electromechanical forces that can be controlled in drive separately.

26 Claims, 18 Drawing Sheets

(PASS THROUGH)

LIGHT MODULATION ELEMENT, ARRAY-TYPE LIGHT MODULATION ELEMENT, DRIVE METHOD THEREOF, AND FLAT-PANEL DISPLAY UNIT

BACKGROUND OF THE INVENTION

1. Field of the Invention

This invention relates to a light modulation element for changing the position of a needle by an electrostatic stress for executing light modulation, an array-type light modulation element, a drive method thereof, and a flat-panel display unit.

2. Description of the Related Art

A light modulation element is available for controlling the amplitude (strength), phase, travel direction, etc., of incident light for processing and displaying an image, pattern data, etc. One of the light modulation elements is a liquid crystal light modulation element using the electro-optic effect of liquid crystal. The liquid crystal light modulation element preferably is used with a liquid crystal display of a thin flat-panel display unit. The liquid crystal display has a structure wherein oriented liquid crystal is entered and sealed between substrates forming a pair of conductive transparent films and sandwiched between orthogonal deflecting plates. The liquid crystal display produces display by applying a voltage to the conductive transparent film for orienting the liquid crystal molecules in the long axis direction perpendicular to the substrate and changing the transmission factor of light from a backlight.

By the way, in the liquid crystal display, light from the backlight is allowed to pass through multiple layers of the deflecting plates, transparent electrodes, and color filter, thus the light use efficiency lowers. The high-grade liquid crystal display requires TFTs and liquid crystal must be sealed between two substrates and be oriented, thus it is difficult to provide a large screen. This is a disadvantage of the liquid crystal display. Further, since light is allowed to pass through between the oriented liquid crystal molecules, the viewing angle becomes narrow. This is another disadvantage of the liquid crystal display.

To solve such disadvantages, an electrostatically driven light modulation element is proposed. This light modulation element comprises an alternating pattern of a first shield section having a plurality of drive electrodes insulated from each other arranged in a predetermined spacing in a predetermined direction and a second shield section movable with positive and negative charges electrostatically induced, the first and second shield sections being placed on a transparent substrate. The voltage applied to the drive electrode is changed, whereby the relative position between the first and second shield sections is changed by an electrostatic stress between the first and second shield sections, thereby changing the transmission factor of light passing through therebetween for executing light modulation.

According to the electrostatically driven light modulation element, light from the light source is allowed to pass through only the transparent substrate, so that the light use efficiency can be raised and the light modulation elements can be easily put into an array by photolithography and etching and liquid crystal need not be poured or oriented, thus the manufacturing costs can be reduced and a large area can be easily provided.

However, in the electrostatically driven light modulation element in the related art described above, the displacement relationship between the applied voltage and the relative position between the first and second shield sections shows a hysteresis characteristic, thus generally the applied voltage to the drive electrode is changed binarily. Therefore, the drive method becomes so-called simple matrix drive for connecting scan signal electrodes and image signal electrodes to the first shield section and the second shield section, scanning the scan signal electrodes in sequence, and applying signal voltages corresponding to the scanned scan signal electrodes to the image signal electrodes. However, in the simple matrix drive, the condition of the voltages applied to the scan signal electrodes and the image signal electrodes depends on the hysteresis characteristic and is restricted. To enhance the image quality of contrast, etc., it becomes necessary to optimize the element structure and fit the hysteresis characteristic to the drive condition.

For binary simple matrix drive, a method of dividing one image display into fields, scanning, and changing the display time for providing gradation is possible as means for providing gradation. In this case, even in a drive method of weighting scan intervals in the fields for decreasing the number of scan times, the write scan time becomes short and a restriction is placed on design so that the light modulation element responds sufficiently to it.

In contrast, some liquid crystal displays adopt active matrix drive of adding active elements (TFT, etc.,) to intersection parts of an XY matrix and applying voltage to liquid crystal through the active elements. In the active matrix drive, scan voltage is applied to scan signal electrodes in sequence and the TFTs connected thereto are turned on in unison. At the same time, a signal is applied from image signal electrodes and charges are accumulated in capacitance of each pixel through the TFTs. At the termination of scanning one line, the TFTs are turned off and the charges accumulated in the pixel capacitance are retained (memorized) intact. According to the active matrix drive, applied voltage can be set as desired in a wide range and comparatively fast response speed and high contrast can be provided, so that high picture quality can also be provided particularly in a moving picture.

Thus, development of light modulation elements having a memory property while inheriting the advantages, thereby enabling active matrix drive is also demanded in the electrostatically driven light modulation elements.

SUMMARY OF THE INVENTION

It is therefore an object of the invention to provide a light modulation element provided with a memory property according to a simple/and low-cost configuration for enabling matrix drive capable of performing the operation at high speed and producing high-contrast display, an array-type light modulation element, a drive method thereof, and a flat-panel display unit.

To the end, in this invention, there is provided a light modulation element for performing electromechanical operation of generating a first electromechanical force for a needle for displacing the needle, thereby changing a transmission factor of light, the light modulation element comprising drive means for generating or canceling a second electromechanical force for the needle in a direction different from that of the first electromechanical force and holding or canceling the displacement state of the needle.

In the light modulation element, the light modulation operation is performed by the first electromechanical force and the displacement state of the needle can be held or canceled in response to the second electromechanical force generated by the drive means. Thus, a memory property can be provided for the light transmission factor of the light modulation element and the element structure enabling active matrix drive can be provided.

In the light modulation element in this invention, the electromechanical force is an electrostatic force produced by an electric field.

In the light modulation element, an electrostatic force acts because of the potential difference caused by voltage application and the first, second electromechanical force can be driven by the electrostatic force.

In the light modulation element in this invention, the electromechanical force is an electromagnetic force.

According to the light modulation element, first, second electro-mechanical force can be driven by the electromagnetic force generated by an electromagnet, etc.

In the light modulation element in this invention, the electro-mechanical force is a force produced by an electrostrictive strain effect.

According to the configuration, the first, second electromechanical force can be driven by the electrostrictive strain force of a piezo-element, etc.

In the light modulation element in this invention, the directions of the first and second electromechanical forces are substantially orthogonal to each other.

According to the configuration, the interference between the electromechanical forces lessens and accurate drive control is enabled.

In the light modulation element in this invention, the direction of the first electromechanical force is substantially horizontal and the direction of the second electromechanical force is substantially vertical.

In the light modulation element, the needle is moved substantially in the horizontal direction by the first electromechanical force, whereby light modulation can be executed and the needle is sucked or attracted substantially in the vertical direction for holding the displacement state of the needle or the electromechanical force is canceled and the displacement state can be canceled.

In the light modulation element in this invention, the direction of the first electromechanical force is substantially vertical and the direction of the second electromechanical force is substantially horizontal.

In the light modulation element, the needle is moved substantially in the vertical direction by the first electromechanical force, whereby light modulation can be executed and the needle is sucked or attracted substantially in the horizontal direction for holding the displacement state of the needle or the electromechanical force is canceled and the displacement state can be canceled.

The light modulation element in this invention comprises a needle being partially supported on the side of a substrate and having electric conductivity and a first fixed electrode and a second fixed electrode being placed facing the needle, wherein the needle is displaced substantially horizontally with respect to the substrate based on a potential difference caused by voltage application to the first fixed electrode and the needle, thereby changing the light transmission factor and wherein the displacement state of the needle is held or canceled by voltage application to the second fixed electrode and the needle.

In the light modulation element, the needle can be moved substantially in the horizontal direction in response to the potential difference by the electrostatic force in the horizontal direction generated by voltage application to the first fixed electrode and the needle, thereby changing the light transmission factor, and the needle can be sucked or attracted substantially in the vertical direction by the electrostatic force in the vertical direction generated by voltage application to the second fixed electrode and the needle, thereby holding the displacement state of the needle or the electrostatic force is canceled and the displacement state can be canceled.

The light modulation element in this invention comprises a needle being partially supported on the side of a substrate and having electric conductivity and a first fixed electrode and a second fixed electrode being placed facing the needle, wherein the needle is displaced substantially vertically with respect to the substrate based on a potential difference caused by voltage application to the first fixed electrode and the needle, thereby changing a light modulation factor and wherein the displacement state of the needle is held or canceled by voltage application to the second fixed electrode and the needle.

In the light modulation element, the needle can be moved substantially in the vertical direction in response to the potential difference by the electrostatic force in the vertical direction generated by voltage application to the first fixed electrode and the needle, thereby changing the light transmission factor, and the needle can be sucked or attracted substantially in the horizontal direction by the electrostatic force in the horizontal direction generated by voltage application to the second fixed electrode and the needle, thereby holding the displacement state of the needle or the electrostatic force is canceled and the displacement state can be canceled.

In the light modulation element in this invention, the needle has a shield property and is placed in an intermediate point on a light path and the light shield amount in the light path is changed by displacement of the needle.

In the light modulation element, the numerical aperture of the light path is changed in response to the displacement amount of the needle having a shield property, placed in an intermediate point on the light path, whereby the light shield amount can be changed.

In the light modulation element in this invention, the light transmission factor of the light modulation element is changed based on any of interference effect, the proximity field optical effect, diffraction effect, or light deflection effect produced as the needle is displaced.

In the light modulation element, the needle is displaced, whereby the light transmission factor can be changed for executing light modulation using the interference effect, such as Fabry-Perot interference, the proximity field optical effect that as a needle moves close to a substrate where light is totally reflected and guided, the light is coupled, the diffraction effect of Bragg diffraction, etc., the light deflection effect of light refraction, or the like.

The light modulation element in this invention comprises a needle partially being supported on a transparent substrate transparent for light to be modulated and having a shield property and electric conductivity, a first fixed electrode being opposed to a first direction of the needle and provided like a wall on a plane perpendicular to the transparent substrate, a second fixed electrode being opposed to a second direction of the needle and provided on a plane parallel to the transparent substrate, and a shield film being formed with an opening left as a light modulation area, wherein the needle is moved in the first direction by an electrostatic force produced by voltage application to the needle and the first fixed electrode, thereby executing light modulation and wherein the needle is sucked or attracted in the second direction by voltage application to the needle and the second fixed electrode for holding the displacement state of the needle or the electrostatic force is canceled for canceling the displacement state.

In the light modulation element, voltage is applied to the needle supported on the transparent substrate and the first fixed electrode opposed to the first direction of the needle, whereby the needle can be displaced in the first direction for executing light modulation, and voltage is applied to the second fixed electrode opposed to the second direction of the needle and the needle, whereby the needle can be sucked or attracted in the second direction for holding the displacement state of the needle or the electrostatic force is canceled and the displacement state can be canceled.

In the light modulation element in this invention, a plurality of the needles and a plurality of the first fixed electrodes are disposed like a grid.

In the light modulation element, a plurality of the needles and a plurality of the first fixed electrodes are disposed like a grid, whereby one pixel area is made up of a plurality of the needles and a plurality of the first fixed electrodes and if an operation failure occurs in any needle, it does not have a large effect on light modulation as the whole of the one pixel area because of presence of another needle, and stable light modulation operation can be performed. The needles and the first fixed electrodes are disposed like a grid, whereby the light modulation element configuration high in space efficiency can be provided.

In this invention, there is provided an array-type light modulation element comprising a plurality of parallel scan signal electrodes, a plurality of image signal electrodes orthogonal to the scan signal electrodes, the elements being placed at intersection points of the scan signal electrodes and the image signal electrodes, characterized in that the displacement state of each needle is held or canceled by a signal of the scan signal electrode and the displacement state of each needle is changed by a signal of the image signal electrode.

In the array-type light modulation element, the needle is displaced by the signal of the image signal electrode for changing the light transmission factor and the displacement state of the needle can be held or canceled by the signal of the scan signal electrode disposed in the direction orthogonal to the image signal electrode; the light modulation state can be provided with a memory property according to a simple configuration without providing the electrode connected separately to each needle. Thus, active matrix drive is enabled.

In this invention, there is provided an array-type light modulation element comprising a plurality of parallel scan signal electrodes, a plurality of latch signal electrodes being placed side by side with the scan signal electrodes, a plurality of image signal electrodes orthogonal to the scan signal electrodes, the latch signal electrodes and light modulation elements, the elements being placed at intersection points of the scan signal electrodes and the latch signal electrodes and the image signal electrodes, characterized in that the displacement state of each needle is held or canceled by signals of the scan signal electrode and the latch signal electrode and the displacement state of each needle is changed by a signal of the image signal electrode.

In the array-type light modulation element, the displacement state of each needle is held or canceled by the signals of the scan signal electrode and the latch signal electrode and the displacement state of each needle can be changed by the signal of the image signal electrode; simply the latch signal electrodes are provided, whereby the light modulation state can be provided with a memory property without changing light modulation control.

In this invention, the light modulation element is in a shield state when the needle does not operate and wherein a light transmission factor increases as the needle is displaced from the shield state by an electrostatic force.

In the array-type light modulation element, the neutral state in which voltage of rightly the same potential is applied to the image signal electrode and the scan signal electrode is adopted as the shield state of the light modulation element, whereby the light modulation element can execute light modulation from the initial shield state to the light passing-through state.

In the array-type light modulation in this invention, the light modulation element is in a light passing-through state when the needle does not operate and wherein a light transmission factor decreases as the needle is displaced by an electrostatic force.

In the array-type light modulation element, the neutral state in which voltage of rightly the same potential is applied to the image signal electrode and the scan signal electrode is adopted as the light passing-through state of the light modulation element, whereby the light modulation element can execute light modulation from the initial light passing-through state to the shield state.

In this invention, there is provided a drive method of an array-type light modulation element, the method comprising the steps of in a write scan period of the light modulation element, canceling holding the needle by a scan signal or a scan signal and a latch signal and displacing the needle to any desired position by an image signal and in a non-write scan period, holding the displacement state of the needle by a scan signal or a scan signal and a latch signal.

In the array-type light modulation element drive method, in the write scan period of the light modulation element, holding the needle is canceled by the scan signal or the scan signal and the latch signal and the needle is displaced to any desired position by the image signal, whereby light modulation can be executed. In the non-write scan period, the needle is held by the scan signal or the scan signal and the latch signal, whereby the displacement state of the needle is held and the light modulation state can be provided with a memory property.

In the array-type light modulation element drive method in this invention, the needle is binary-driven with two positions as displacement destinations.

In the array-type light modulation element drive method, the needle is moved to either of the two different positions in response to the potential difference between the image signal electrode and the needle, whereby the light modulation state can be set selectively between the shield state and the light passing-through state and binary drive is enabled.

In the array-type light modulation element drive method in this invention, the needle is driven for providing multiple levels of gray with any desired positions as displacement destinations.

In the array-type light modulation element drive method, the needle is moved to any desired position in response to the potential difference between the image signal electrode and the needle, whereby an arbitrary light modulation state can be set selectively between the shield state and the light passing-through state and multiple tone drive is enabled.

In the array-type light modulation element drive method in this invention, the move distance of the needle is set in response to a voltage level applied to the image signal.

In the array-type light modulation element drive method, the voltage level applied to the image signal electrode is changed, whereby the needle can be moved to any desired position and modulated light can be changed in analog manner. Thus, multiple tone drive is enabled.

In the array-type light modulation element drive method in this invention, the move distance of the needle is set in response to the voltage application time to the image signal.

In the array-type light modulation element drive method, the voltage application time applied to the image signal electrode is changed, namely, PWM (pulse width modulation), etc., is executed, whereby the needle can be moved to any desired position and modulated light can be changed in analog manner. Thus, multiple tone drive is enabled.

In the array-type light modulation element drive method in this invention, the needle is driven at displacement response speed responsive to the voltage level applied to the image signal.

In the array-type light modulation element drive method, the force of electrostatically sucking the needle is changed in response to the voltage level applied to the image signal electrode in the write scan period, and the needle move distance is changed after the expiration of a given time since holding the needle was released, so that the needle can be moved to any desired position.

In the array-type light modulation element drive method in this invention, the needle is held at a position where the needle is elastically urged at the write scan start time over the light modulation element, wherein holding the needle is canceled after the expiration of an arbitrary time, and wherein the needle is again held at the termination of the write scan.

In the array-type light modulation element drive method, the needle is held at the position where the needle is elastically urged at the write scan start time over the light modulation element, and holding the needle is canceled after the expiration of an arbitrary time, whereby the needle starts to move, and the needle is again held at the termination of the write scan, whereby the needle is held at any desired position, so that the needle can be moved to any desired position.

In the array-type light modulation element drive method in this invention, the period during which the needle is held at the position where the needle is elastically urged is set overlapping a write scan period over another row.

In the array-type light modulation element drive method, the period during which the needle is held at the position where the needle is elastically urged is set overlapping the write scan period over another row, whereby even the light modulation element whose response speed is low can be driven at high speed without wasting the time.

In this invention, there is provided a flat-panel display unit comprising an array-type light modulation element, a surface light source being placed facing the array-type light modulation element, and fluorescent material being placed on an opposite side to the surface light source with the array-type light modulation element between, characterized in that light passing through the array-type light modulation element causes the fluorescent material to emit light for producing display.

According to the configuration, the needle is moved by the electrostatic suction force for changing the light transmission factor of the light modulation element and light emitted from the surface light source via the light modulation element is applied to the fluorescent material, thereby exciting the fluorescent material for emitting light, enabling image display based on image information. Thus, the light from the light source can be applied directly to the fluorescent material for improving the light use efficiency, and the viewing angle can be widened because of the scattering property of the fluorescent material. Since the needle is operated electromechanically, the drive voltage can be lowered and the light modulation state can be held, thus active matrix drive is enabled and high image quality can also be provided in a moving picture. Further, multiple tone drive is also enabled.

In the flat-panel display unit in this invention, the light emitted from the light source is ultraviolet light.

According to the configuration, the display unit with ultraviolet light as a light source can be provided.

DESCRIPTION OF THE PREFERRED EMBODIMENTS

Referring now to the accompanying drawings, there are shown preferred embodiments of light modulation elements, array-type light modulation elements, drive methods thereof, and flat-panel display units according to the invention.

Figure 1:
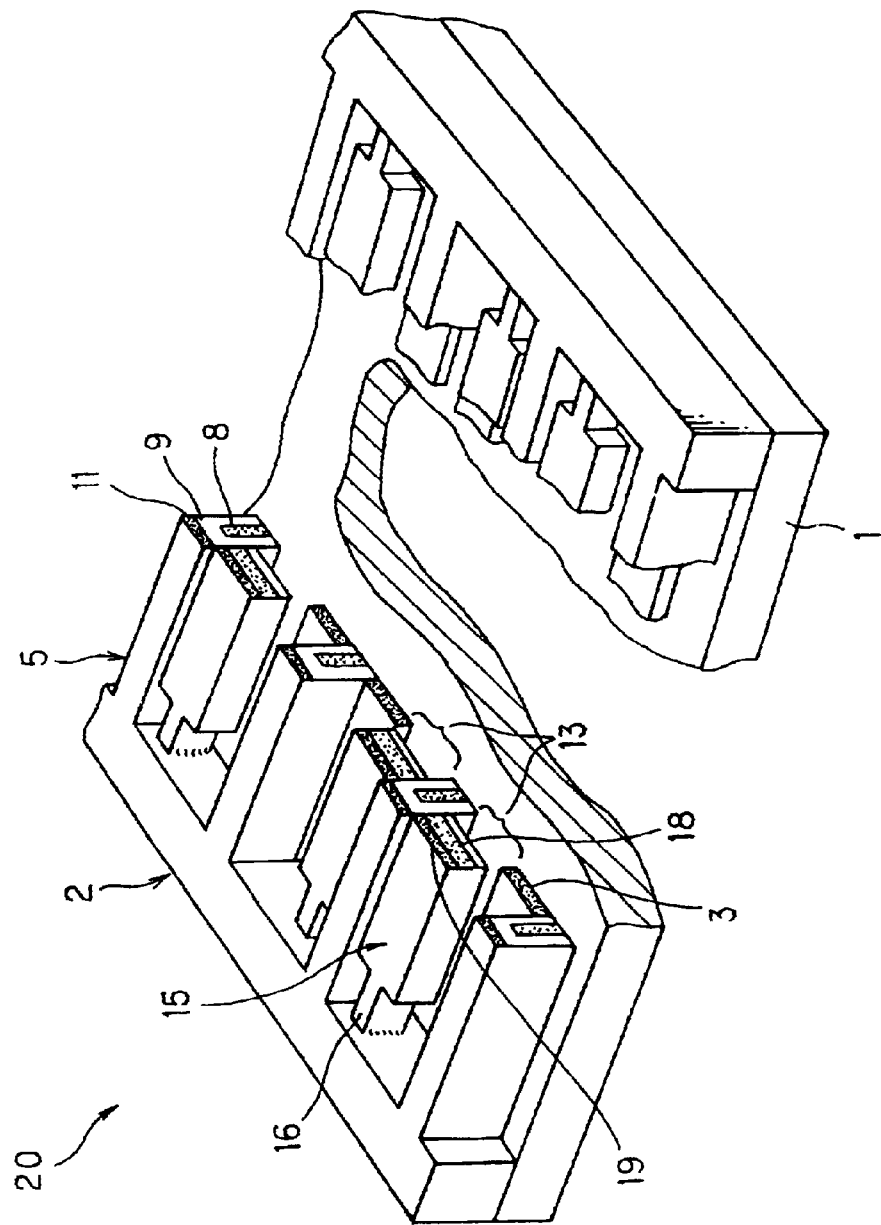
FIG. 1 is a perspective view of a light modulation element with parts partially broken away according to the invention.
Figure 2:
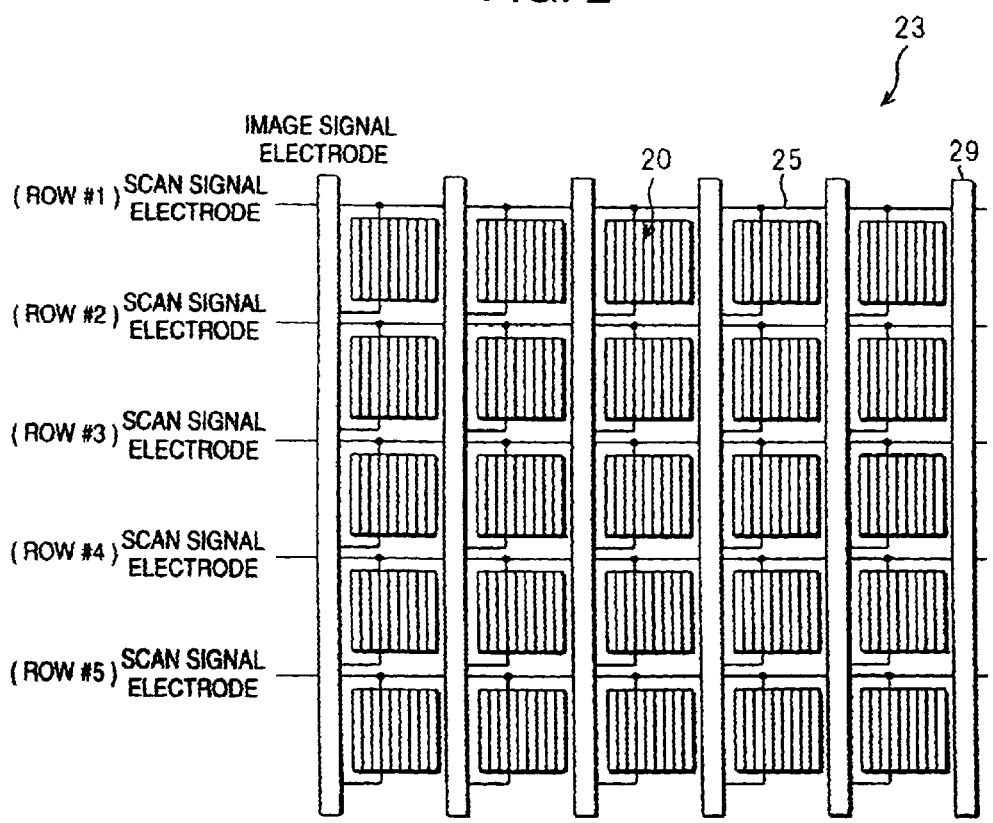
FIG. 2 is a plan view of an array-type light modulation element comprising the light modulation elements in FIG. 1 arranged like a two-dimensional matrix.

FIG. 1 is a perspective view of a light modulation element with parts partially broken away according to a first embodiment of the invention, and FIG. 2 is a plan view of an array-type light modulation element comprising the light modulation elements in FIG. 1 arranged like a two-dimensional matrix.

First, the configuration of the light modulation element will be discussed. As shown in FIG. 1, a grid body 2 is placed on a transparent substrate 1 transparent for light having an insulation property to be modulated. The grid body 2 is formed with a plurality of grid walls 5 spaced from each other at given intervals, and a belt-like electric conductor (first fixed electrode) 8 is formed inside each grid wall 5. Further, the electric conductor 8 is covered on the surface with an insulator 9 and is insulated from an adjacent member. The grid wall 5 is formed on the upper end face with a shield film 11 for preventing light introduced from below the transparent substrate 1 from being emitted from the upper end face of the grid wall 5. To use the light modulation elements with a display unit, the grid walls 5 can be used as a black matrix for improving the contrast ratio.

The grid walls 5 each being formed with a shield-property conductive film 3 (second fixed electrode) adjoining the grid wall 5 on the transparent electrode 1 on both left and right sides of the grid wall 5 and those formed with nothing on both sides are place alternately. The shield-property conductive film 3 is a film body having a shield property and electric conductivity.

The area in which the shield-property conductive film 3 is not formed between the adjacent grid walls 5 becomes a light modulation area 13 and the light introduced from below the transparent substrate 1 passes through the light modulation area 13 and is emitted to the top side of the transparent substrate 1.

A needle 15 is disposed above the light modulation area 13. It comprises a narrow part 16 having a cross-sectional area lessened at both ends in the length direction of the needle, and the narrow parts 16 are connected to the grid body 2. Thus, the narrow parts 16 become weak parts and deformed, whereby the needle 15 can be moved in parallel and vertical directions to the transparent substrate 1. The needle 15 is formed with a belt-like electric conductor (charged body) 18 and a shield film 19. The electric conductor 18 and the shield film 19 may be formed of a shield-property conductive film in one piece.

In a neutral state (when the electric conductors are at the same potential), the needle 15 is placed above the light modulation area 13 for preventing light passing through the light modulation area 13 from being emitted to the top side of the light modulation element 20.

The described light modulation elements 20 can be used for an array-type light modulation element 23. The array-type light modulation element 23 comprises a plurality of scan signal electrodes 25 arranged in parallel and a plurality of image signal electrodes 29 arranged in parallel orthogonal to the scan signal electrodes 25 with the light modulation elements being placed at the intersection parts of the scan signal electrodes 25 and the image signal electrodes 29. In addition, a common electrode exists, but is not shown in FIG. 2.

Figure 3A:
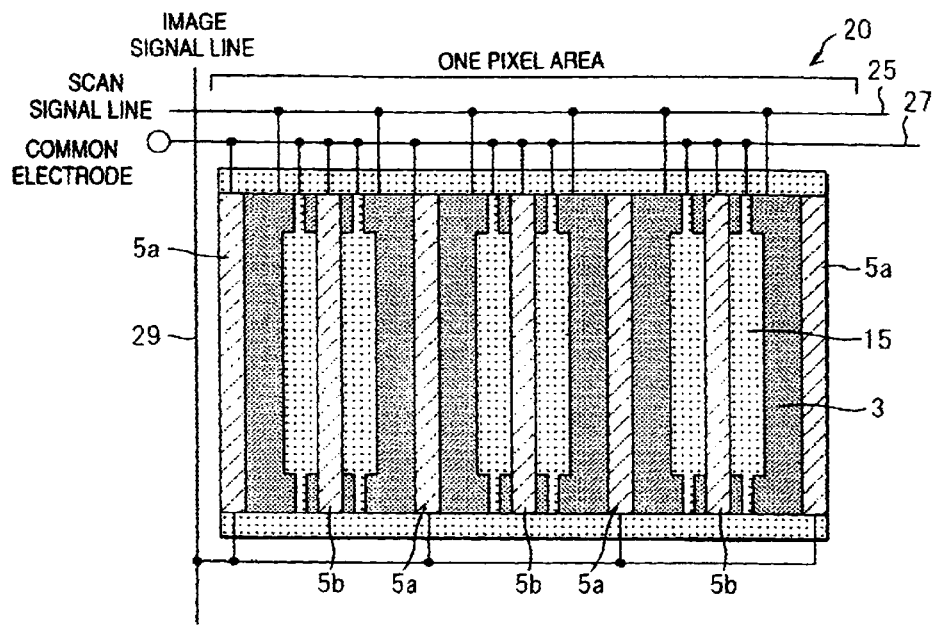
FIGS. 3A and 3B are plan views to show one pixel area of the light modulation element shown in FIG. 1.
Figure 3B:
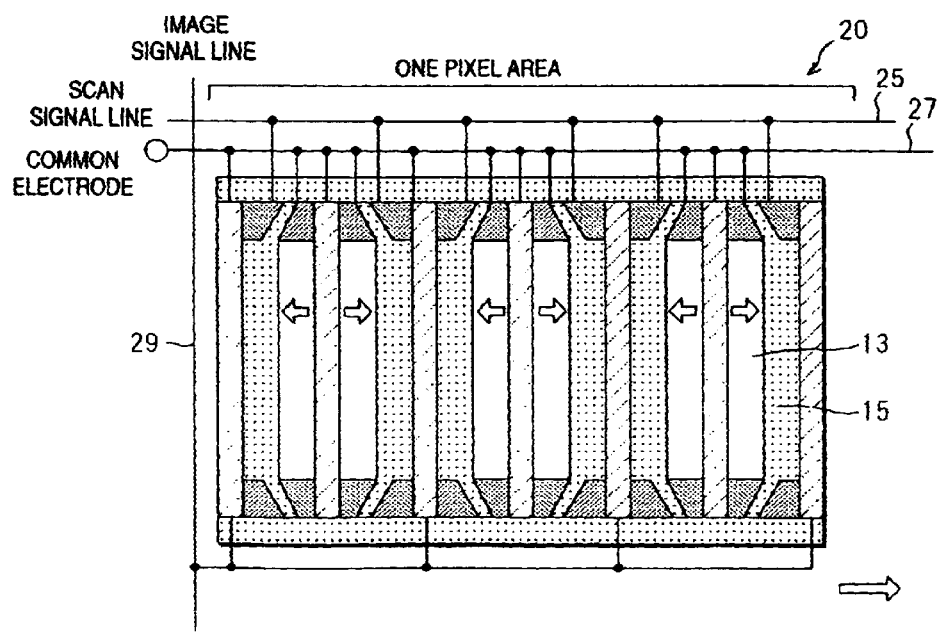

FIGS. 3A and 3B are plan views to show one pixel area of the light modulation element; FIG. 3A shows the one pixel area in a neutral state (shield state) and FIG. 3B shows the one pixel area at the write scan time (light passing-through state). As shown here, the shield-property conductive films 3 on the transparent substrate are connected to the scan signal electrode 25, the grid walls (fixed electrodes) 5a placed away from the needles 15 in the neutral state are connected to the image signal electrode 29, and the grid walls (fixed electrodes) 5b close to the needles 15 in the neutral state and the needles 15 are connected to the common electrode 27.

In the neutral state (shield state) in FIG. 3A, the electrodes are at the same potential. If all potentials are set to 0 [V] as an example, the light modulation element enters the shield state.

At the write scan time in FIG. 3B, voltage Va [V] is applied only to the image signal electrode 29, each needle 15 is sucked and moved in the horizontal direction to the opposite grid wall 5, and the opening of the light modulation area 13 appears. At this point in time, an electrostatic force in the vertical direction (vertical direction to the paper plane of FIG. 3) is not produced.

Next, the specific operation principle of the light modulation element 20 will be discussed with reference to FIGS. 4A to 4C, which are sectional views of the main part of the light modulation element 20 shown in FIG. 4A.

Figure 4A:
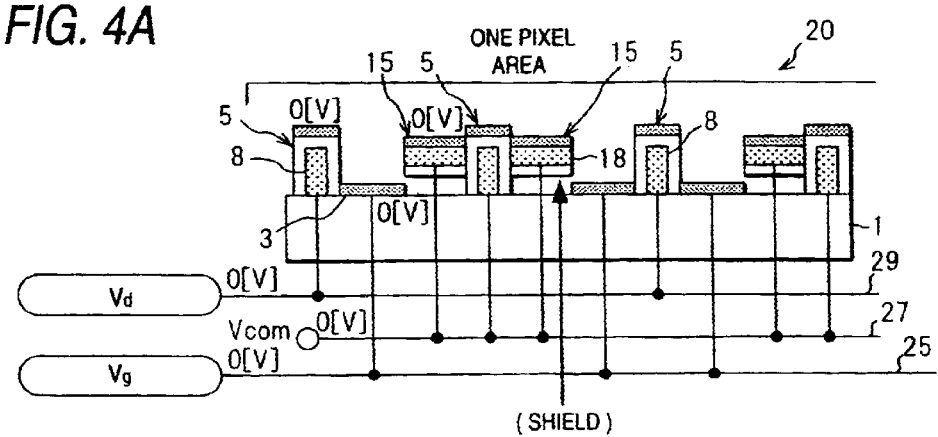
FIGS. 4A to 4C are schematic representations of the operation of the light modulation element in the first embodiment of the invention.

First, the state shown in FIG. 4A is the initial state (neutral state), in which light from the transparent substrate 1 cannot pass through (shield state) and the voltages of all electrodes are 0 [V].

Figure 4B:
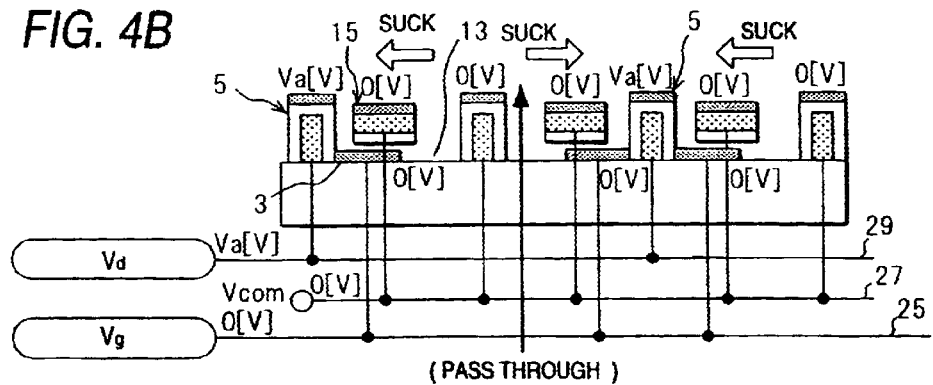

Next, the state shown in FIG. 4B is the state at the write scan time and voltage Va [V] responsive to image information is applied to the image signal electrode 29 so as to enter a desired light passing-through state, whereby an electrostatic force (first electromechanical force) occurs at the needles 15 and the needles 15 are sucked and moved in the horizontal direction. In this case, voltage of 0 [V] is applied to scan signal voltage Vg and the potential difference from the common electrode 27 is set to zero, thereby eliminating the electrostatic force in the vertical direction (second electromechanical force).

For example, when image signal voltage Vd is 0 [V], the needles 15 are restored to the neutral state for setting the shield state and when the voltage Vd rises (Vd=Va[v]), the needles 15 move horizontally in the direction of the grid walls 5 connected to the image signal electrode 29 and the openings of the light modulation areas 13 appear.

Figure 4C:
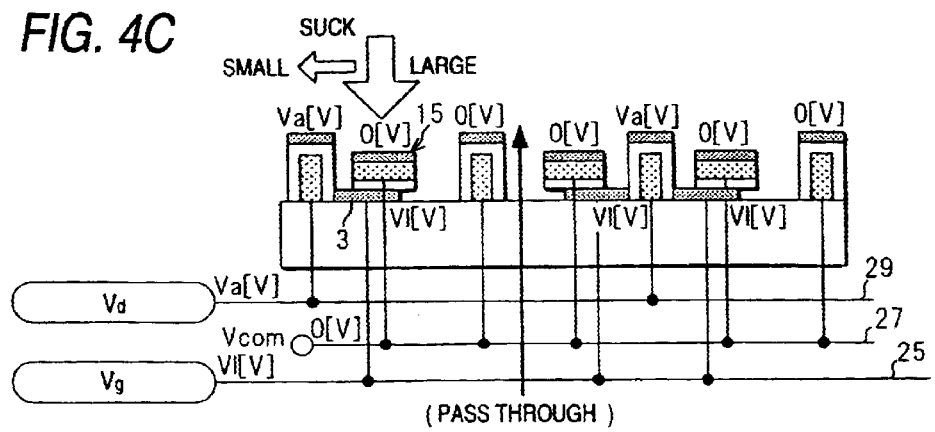

Subsequently, voltage V1 [V] is applied to the scan signal electrode as shown in FIG. 4C. Then, an electrostatic force acts in the vertical direction as a latch force and the needles 15 are attracted to the shield-property conductive films 3. The latch force becomes larger because of the friction force of the attraction, but if a sufficient latch force is provided, attraction is not necessarily required and simply the suction force may be enough. The level of the voltage V1 [V] is set so that the latch force becomes sufficiently larger than the electrostatic force in the horizontal direction generated by the voltage applied to the image signal electrode 29 and the elastic force of the needles 15 in the horizontal direction. The voltage V1 [V] is determined in response to the material, shape, gap, etc., of each electrode; preferably, if the voltage V1 is low, a large electrostatic force in the vertical direction is generated by enlarging the area of the bottom face aggressively or lessening the gap from the transparent substrate 1 so that the electrostatic force works largely in the vertical direction of the needles 15.

Thus, a desired light passing-through state is held (latched) at the end of the write scan over the light modulation element. Further, after this, if the scan line becomes a non-selection (non-write) period, the latched light passing-through state can be held with no change independently of the image signal voltage. When write scan (selective scan) is again executed, voltage 0 [V] is applied to the scan signal electrode 25 and the latch force is set to zero.

Figure 5:
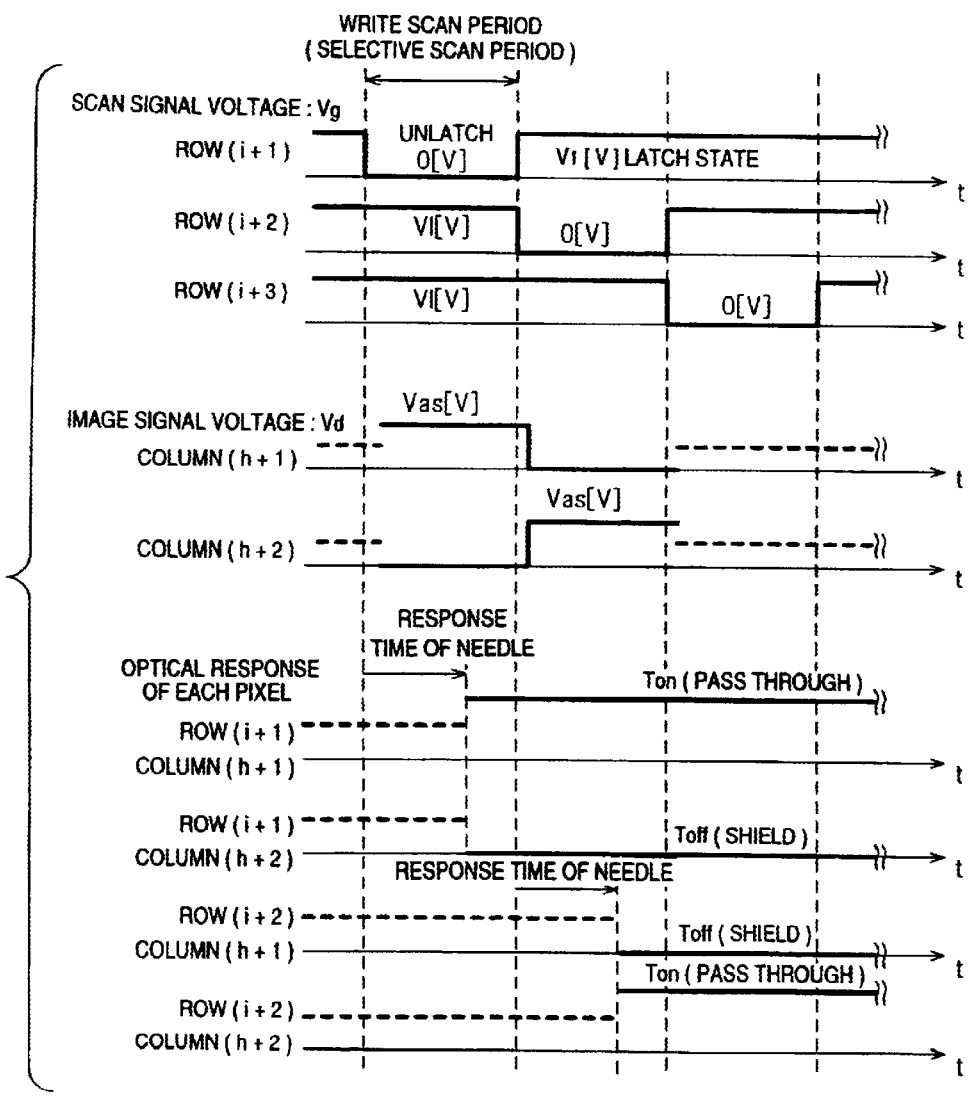
FIG. 5 is a drawing to show a drive sequence example of the light modulation element in the first embodiment of the invention.

Next, a drive method of binary display with the light modulation elements shown in FIG. 1 will be discussed. FIG. 5 shows a drive sequence example of binary display with the light modulation elements.

Shown here is an example of writing a binary light transmission factor state into each pixel of the array-type light modulation element comprising the light modulation elements arranged in two dimensions as follows:

Pixel at row (i+1) column (h+1)→Ton (passing through)
Pixel at row (i+1) column (h+2)→Toff (shield)
Pixel at row (i+2) column (h+1)→Toff (shield)
Pixel at row (i+2) column (h+2)→Ton (passing through)

In write scan, the scan signal voltage Vg of the scan row is set to 0 [V] for unlatching, then the image signal voltage Vd is applied to the corresponding column. Specifically, voltage Vas [V] sufficient for the needles 15 to horizontally move is applied to the pixel to allow light to pass therethrough, and 0 [V] is applied to the pixel to shield light therein for placing the needles 15 in the neutral state. The scan signal voltage Vg is set to V1 [V] in a sufficient element response time and the needle 15 state (light passing-through state) for the row is latched. This period becomes the one-row write scan (selective scan) period and likewise, scan is executed over the next line. When scan is executed over all rows in the sequence, one screen is written.

According to this, for the non-selection row, the light passing-through state can be held independently of the image signal voltage Vd and stable matrix drive can be executed independently of the hysteresis characteristic proper to the structure of the element. Thus, a leap upward in the flexibility of element design is provided and image quality performance of contrast, crosstalk prevention between adjacent pixels, etc., is also improved.

Next, a gradation display method will be discussed.

For example, if a voltage of a predetermined level value is applied as the image signal voltage Vd shown in FIG. 4, the move speed (displacement response speed) of each needle 15 is changed in response to the level of the applied voltage Vd and resultantly, the move distance is changed. Thus, the level of the applied voltage is adjusted, whereby the strength of the generated electrostatic suction force is controlled, the move distance of the needle is changed, the light transmission factor of the light modulation element is changed, and gradation drive can be executed.

Here, electrostatic suction force f is represented by $$f=DE/2 \qquad (1)$$

where f is suction force [N/mm$^2$], D is dielectric flux density [C/m$^2$], and E is electric field strength [V/m]. The dielectric flux density D has the following relation:

$$D=\epsilon E=\epsilon V/L \qquad (2)$$

and can be represented by expression (3):

$$f=\epsilon V^2/(2L^2) \qquad (3)$$

where $\epsilon$ is a dielectric constant [F/m], V is voltage between electrodes [V], and L is distance between electrodes [m]. That is, it is seen that the electrostatic suction force is proportional to the square of the voltage applied between pole plates.

Thus, the applied voltage is controlled, whereby the move distance of the needle 15 can be changed and the light emitted from the light modulation element can be changed as desired. In this case, the modulation voltage may be frequency modulation for changing the pulse length, the number of pulses as well as amplitude modulation. Even in such a drive method, as described above, latch voltage is applied just after move of the needle 15 is complete at a desired position, and the needle 15 is held at the position.

The drive method makes it possible to execute analog drive of moving the needle 15 to any desired position. Resultantly, multiple tone drive of analogically changing modulated light form the light modulation element 23. If latch voltage is applied at the position to which the needle 15 is moved, setup gradation can be provided with a memory property.

Figure 6:
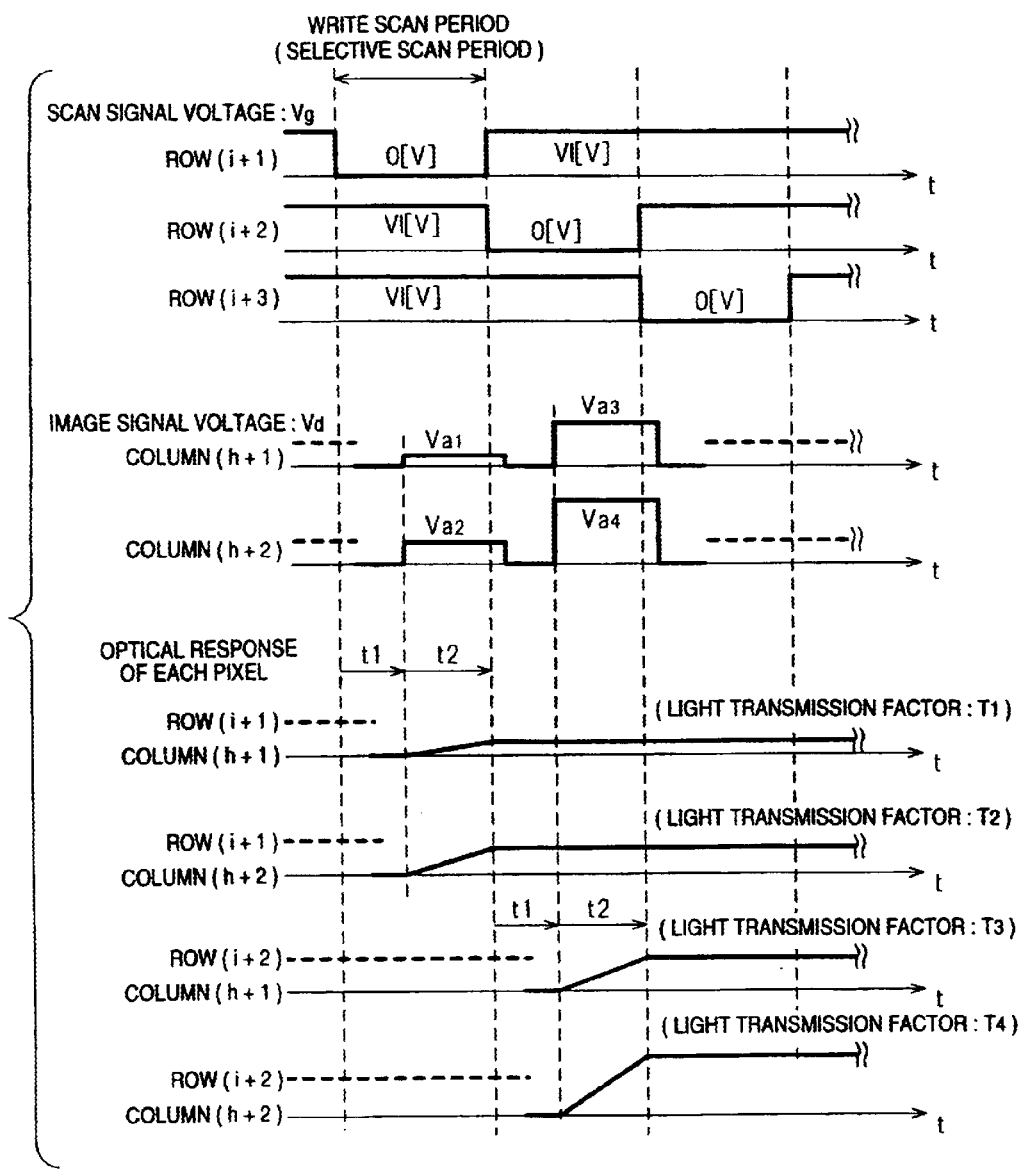
FIG. 6 is a drawing to show a drive sequence of multiple tone display of the light modulation element using analog voltage.

FIG. 6 is a drawing to describe a drive sequence of multiple tone display of the light modulation element using analog voltage. An example of writing the following arbitrary light transmission factor states into a two-dimensional array-type light modulation element as shown in FIG. 2 will be discussed with reference to FIG. 6.

Pixel at row (i+1) column (h+1)→(light transmission factor: T1)
Pixel at row (i+1) column (h+2)→(light transmission factor: T2)
Pixel at row (i+2) column (h+1)→(light transmission factor: T3)
Pixel at row (i+2) column (h+2)→(light transmission factor: T4) where T1<T2<T3<T4.

The write scan (selective scan) period over each row consists of two times of t1 and t2. At t1, the scan signal voltage Vg is set to 0 [V] and latch is canceled. Then, the image signal voltage Vd is set to 0 [V] and the needle 15 is once placed in the neutral state (shield state).

Figure 7:
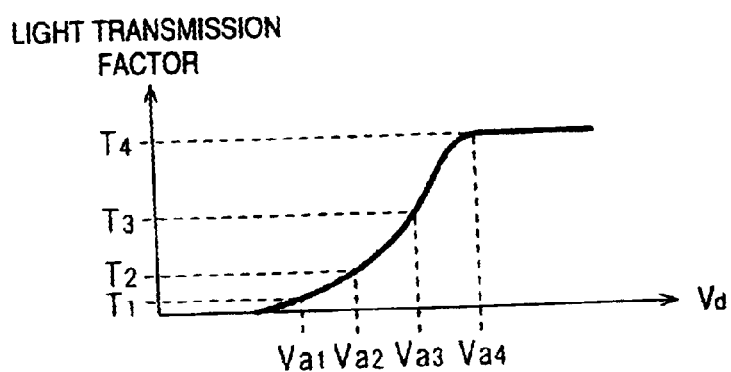
FIG. 7 is a drawing to show a light transmission factor characteristic responsive to the displacement response speed of a needle.

At t2, any desired voltage is applied as the image signal voltage Vd. At this time, the displacement response speed of the needle varies with the applied voltage level. If the scan signal voltage Vg is set to V1 [V] and the state is latched in one given time, the light transmission factor at the latch time becomes a different value as shown in a light transmission factor characteristic drawing of FIG. 7 in response to the displacement response speed of the needle. Using this light transmission factor characteristic, the following voltages are applied as the image signal voltage Vd of each pixel:

Pixel at row (i+1) column (h+1)→Va1
Pixel at row (i+1) column (h+2)→Va2
Pixel at row (i+2) column (h+1)→Va3
Pixel at row (i+2) column (l+2)→Va4

Thus, the pixels are set to the target light transmission factors T1 to T4. Thus, any desired light transmission factor state can be written using analog voltage and the light transmission factor of each pixel can be set to any desired value.

Thus, the needle 15 is once restored to the neutral state at t1, then is displaced in response to any desired image signal voltage, so that any needle can provide analog gradation with good reproducibility independently of the immediately preceding state.

Next, a first modified example of the first embodiment will be discussed with reference to FIGS. 8A and 8B, which are sectional views of the main part to show the configuration of a light modulation element 30 in the first modified example.

The light modulation element shown in FIGS. 4A to 4C comprises an alternating placement pattern of the needles 15 and the grid walls 5. However, in the first modified example, as shown in FIGS. 8A and 8B, only grid walls 5 placed away from needles 15 at the neutral position are placed and the grid wall between the close needles 15 is omitted and instead, shield films 3a are formed on a transparent substrate 1.

The operation of the light modulation element is similar to that in the first embodiment. Scan signal voltage Vg is set to 0 [V] for unlatching and Va [V] is applied as image signal voltage Vd for moving the needle 15 to the grid wall 15 side. Then, the signal voltage Vg is set to V1 [V] and the needle 15 is latched at the position to which it is moved.

Thus, some grid walls are omitted, whereby the numerical aperture can be enhanced. Since the needles are always at the same potential, they can be brought close to each other as much as possible in element preparation.

Figure 9:
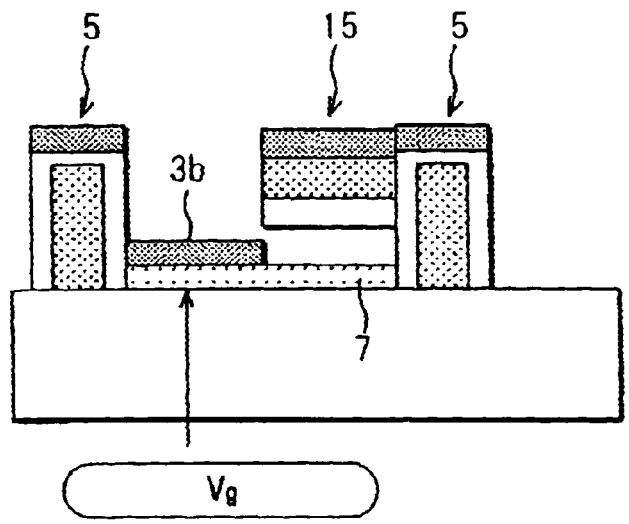
FIG. 9 is a sectional view of the main part to show the configuration of a light modulation element in a second modified example of the first embodiment.

Next, a second modified example of the first embodiment will be discussed with reference to FIG. 9, which is a sectional view of the main part to show the configuration of a light modulation element in the second modified example.

In the first embodiment, the shield film 3 is given electric conductivity and is connected to the scan signal electrode 25. However, as shown in FIG. 9, a transparent conductive film 7 of ITO, etc., may be formed on a transparent substrate of the whole area where a needle 15 is moved, and a shield film 3b may be formed partially on the transparent conductive film 7.

According to this configuration, the electrostatic force in the vertical direction when the needle 15 is latched is constant and large regardless of the position of the needle, and it is made possible to latch the needle stably at low voltage.

Figure 10:
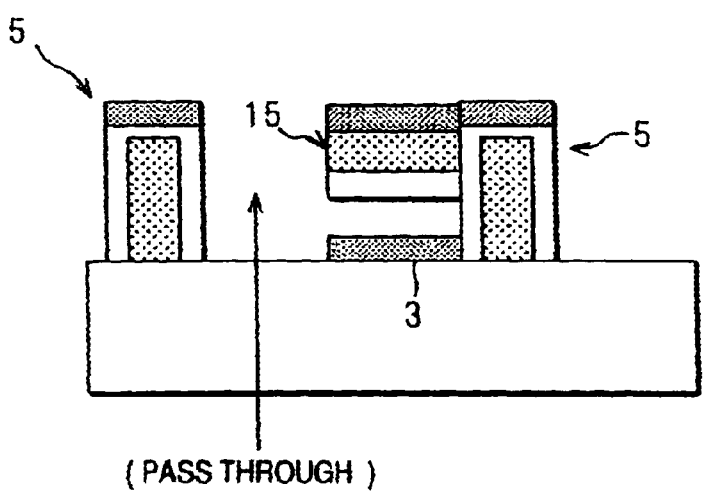
FIG. 10 is a sectional view of the main part to describe the operation of a light modulation element in a third modified example of the first embodiment.

Next, a third modified example of the first embodiment will be discussed with reference to FIG. 10, which is a sectional view of the main part to show the operation of a light modulation element in the third modified example.

In the first embodiment, the neutral state (initial state) becomes the shield state. However, as shown in FIG. 10, a needle 15 and a shied film 3 on a transparent substrate may be placed so that a light passing-through state is entered with an opening made in the neutral state (initial state). In this configuration, if voltage is applied between a grid wall 5 and the needle 15, the needle 15 is moved in a shielding direction.

Thus, an image signal is directly input, whereby image information can be displayed negatively and a different display mode can be provided in response to the application of the light modulation element; in addition, to use the light modulation element for an application in which the frequency of placing the light modulation element in a light passing-through state is high, power consumption for drive is suppressed and the drive power can be reduced.

In the first embodiment and the modified examples thereof, the electric conductor 8 of the grid wall 5 is connected to the image signal electrode 29 and the shield-property conductive film 3 parallel to the substrate face on the transparent substrate 1 is connected to the scan signal electrode 25. However, the connection configuration may be reversed, namely, the electric conductor 8 may be connected to the scan signal electrode 25 and the conductive film 3 may be connected the image signal electrode 29. In this case, a configuration in which the light transmission factor changes as the needle 15 moves vertically to the transparent substrate 1 becomes necessary. As an example of this configuration, the interference effect, such as Fabry-Perot interference, can be used, namely, light modulation can be executed as the gap between the transparent substrate and the needle changes as the needle moves vertically. For the light modulation executed as the needle moves vertically, latching and unlatching based on horizontal move can also be controlled using the scan signal electrode.

Light modulation using the proximity field optical effect that as a needle moves close to light totally reflected and guided in a transparent substrate, the light is coupled to the needle side can also be executed. Likewise, further light modulation using the diffraction effect of Bragg diffraction, etc., the light deflection effect of light refraction, or the like is also possible.

In the embodiment, the electromechanical operation using the electrostatic force produced by an electric field is shown as an example. However, in addition, likewise the needle 15 can also be driven by an electromagnetic force of an electromagnet, etc., or a force produced by the electrostrictive strain effect of a piezo-element, etc.

Next, a second embodiment of light modulation element according to the invention will be discussed with reference to FIGS. 11 to 18.

Figure 11:
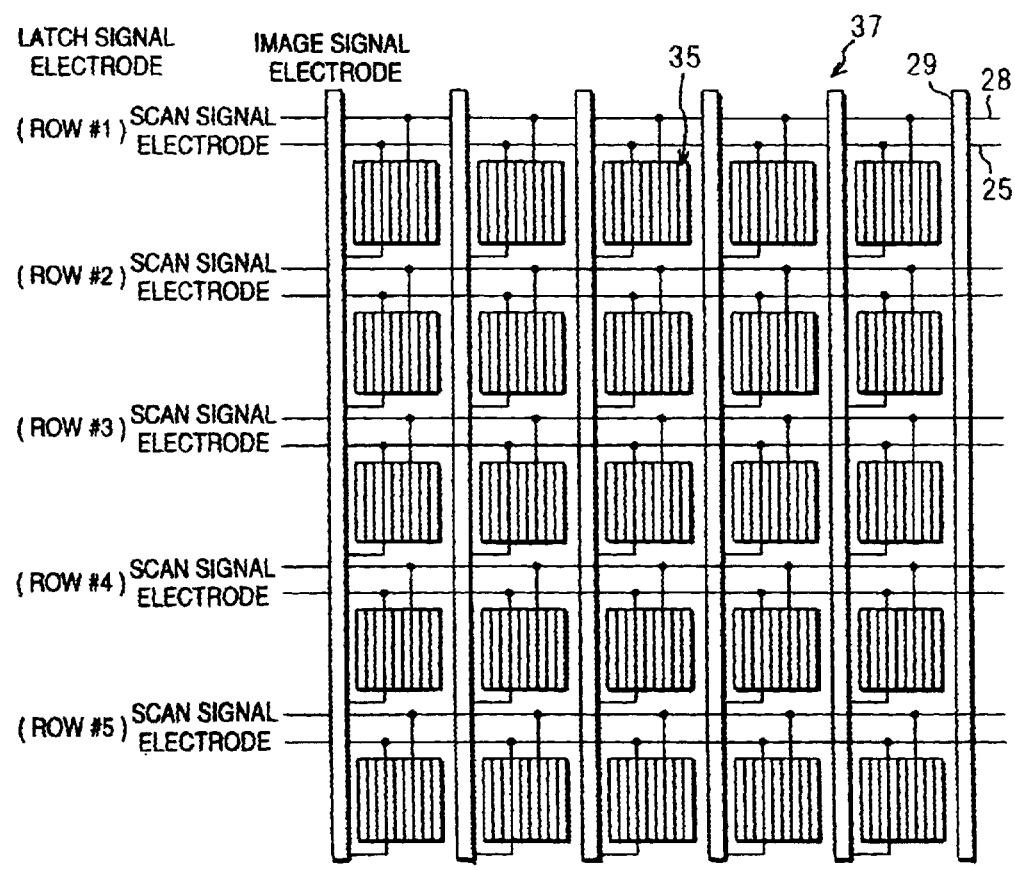
FIG. 11 is a plan view of an array-type light modulation element comprising light modulation elements according to a second embodiment of the invention arranged like a matrix.

FIG. 11 is a plan view of an array-type light modulation element 37 comprising light modulation elements 35 according to the second embodiment of the invention arranged like a two-dimensional matrix. In the embodiment, the neutral state becomes the light passing-through state, scan signal electrodes 25 and latch signal electrodes 28 are provided in a one-to-one correspondence with rows, image signal electrodes are provided in a one-to-one correspondence with columns, and the light modulation elements 35 are placed at the intersection parts, forming the array-type light modulation element 37.

Figure 12A:
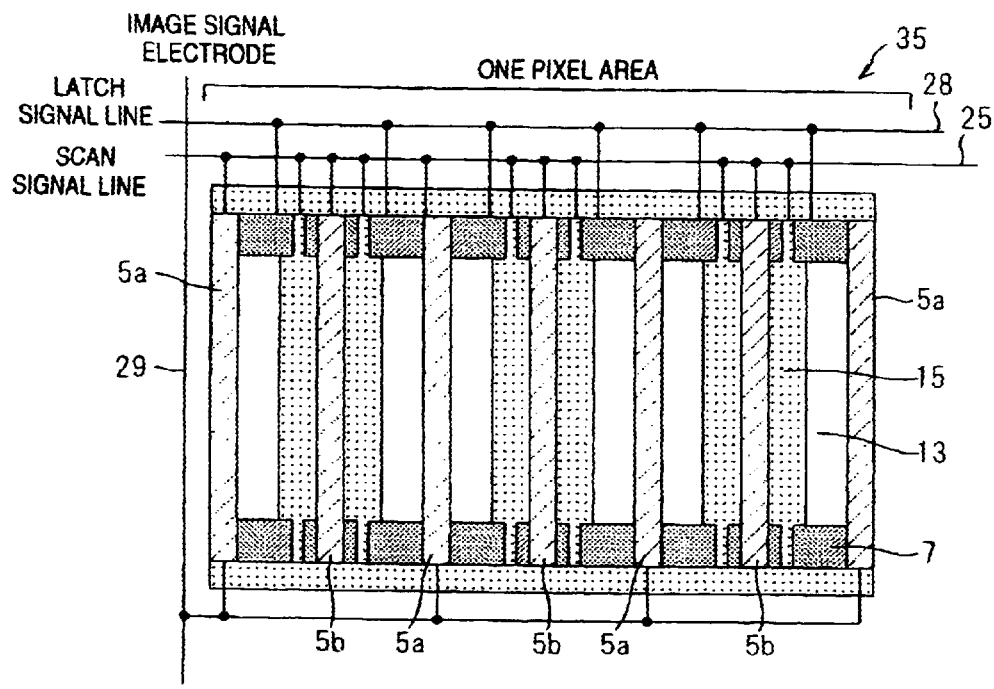
FIGS. 12A and 12B are plan views to show one pixel area of the light modulation element shown in FIG. 11.
Figure 12B:
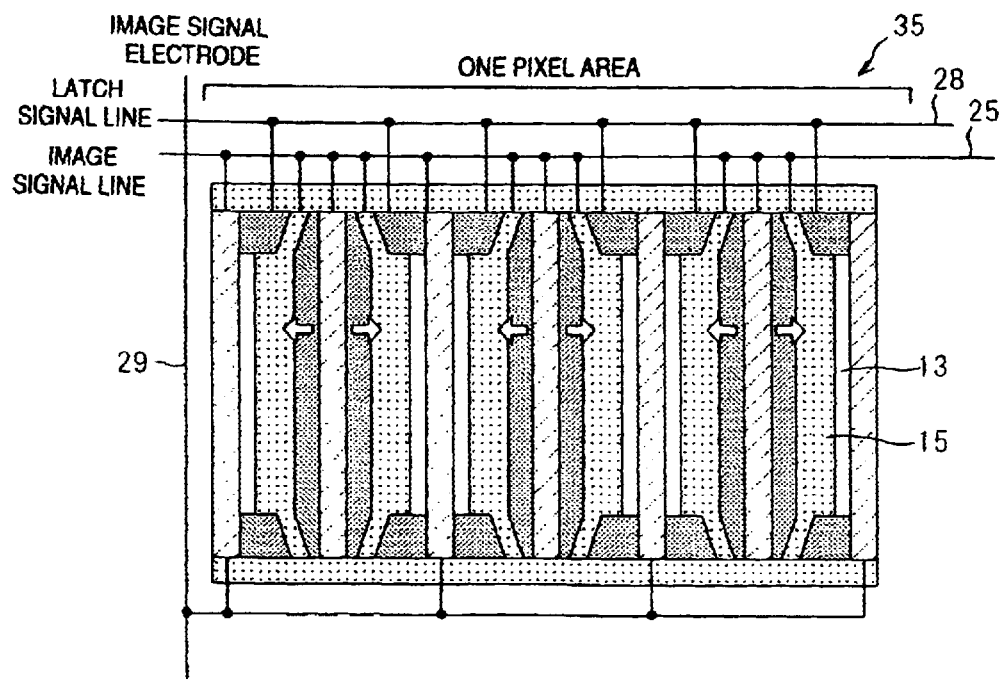

FIGS. 12A and 12B are plan views to show one pixel area of the light modulation element 37 shown in FIG. 11. In FIGS. 12A and 12B, each grid wall 5b close to a needle 15 in a neutral state and the needles 15 are connected to the scan signal electrode 25. Transparent conductive films 7 on a transparent substrate 1 are connected the latch signal electrode 28. Each grid wall 5a placed away from the needle 15 in the neutral state is connected to the image signal electrode 29. The relationship between the transparent conductive films 7 on the transparent substrate 1 and shield-property conductive films 3 is similar to that previously described with reference to FIG. 9.

In the neutral state in FIG. 12A, the electrodes are at the same potential (0 [V]). In this state, the light modulation element of the embodiment enters the maximum light passing-through state.

At the write scan time shown in FIG. 12B, if the scan signal electrode 25 and the latch signal electrode 28 are set to the same potential for eliminating the electrostatic force in the vertical direction and, for example, any desired voltage is applied between the scan signal electrode 25 and the image signal electrode 29, the needle 15 is moved horizontally toward the grid wall 5 placed away from the needle 15 for decreasing the opening area of a light modulation area 13, and finally a shield state is entered.

Next, the specific operation principle of the light modulation element 35 will be discussed with reference to FIGS. 13A to 13C, which are sectional views of the main part of the light modulation element shown in FIGS. 12A and 12B.

Figure 13A:
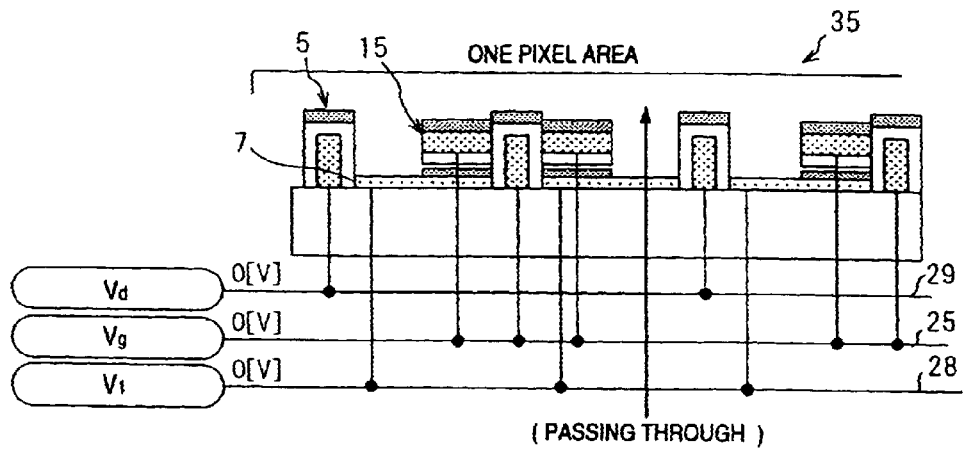
FIGS. 13A to 13C are schematic representations of the operation of the light modulation element shown in FIGS. 12A and 12B.

The state shown in FIG. 13A is the neutral state, in which the three electrodes are at the same potential. As an example, all potentials are set to 0 [V]. At this time, the light modulation element enters the maximum light passing-through state.

Figure 13B:
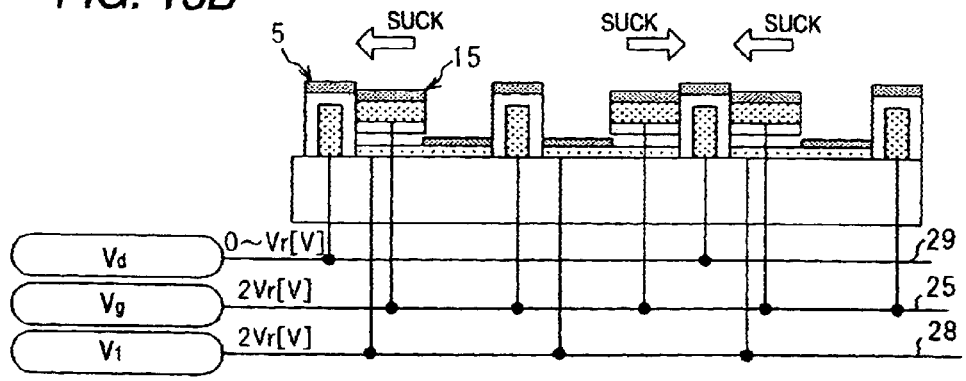

FIG. 13B shows a shield state provided by moving each needle 15 to the grid wall 5 opposed to the needle 15. At this time, the needle 15 is elastically urged by narrow parts 16 and a force for attempting to restore the needle to the neutral position acts on the needle.

As shown, if potential difference Vr [V], for example, occurs between the scan signal electrode 25 and the image signal electrode 29, an electrostatic suction force over the elastic force of the needle 15 acts and the needle 15 is horizontally moved to the opposed grid wall 5, whereby the light modulation element enters the shield state. At this time, the scan signal electrode 25 and the latch signal electrode 28 are set to the same potential so as to prevent the electrostatic force in the vertical direction from occurring.

In the actual matrix drive, the state becomes the state of "preset scan" executed before write scan. In fact, image signal voltage Vd depends on the write voltage of another row, thus a voltage in the range of 0 [V] to Vr [V] is applied to the image signal electrode 29, thereby preventing the needle 15 from being released accidentally at the non-selection time. Thus, in a write sequence, for the voltage Vr [V], to forcibly set the shield state independently of the image signal voltage Vd, voltage of 2 Vr [V] is applied to the scan signal electrode 25. At the same time, voltage of 2 Vr [V] is applied to set the latch signal electrode 28 to the same potential.

Figure 13C:
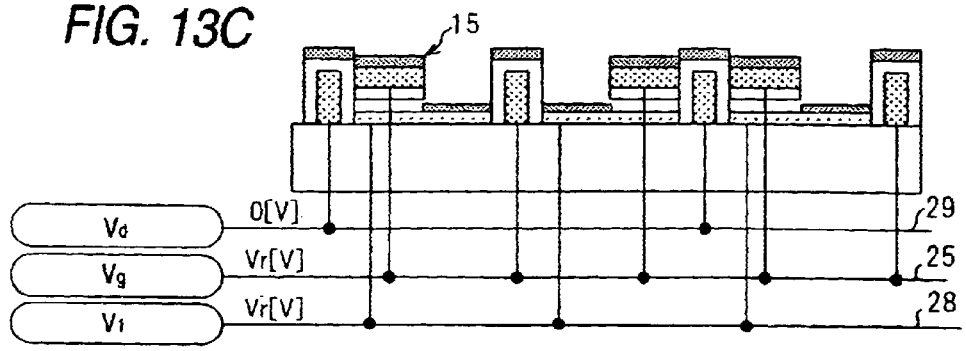

FIG. 13C shows a state at the write scan start time, in which voltage of 0 [V] is applied the image signal electrode 29 and voltage of Vr [V] is applied to the scan signal electrode 25 and the latch signal electrode 28, whereby the scan signal electrode 25 and the latch signal electrode 28 are set to the same potential, the electrostatic force in the vertical direction does not act on the needle 15, and the voltage difference of Vr [V] is only applied between the scan signal electrode 25 and the image signal electrode 29, thus the same state as in FIG. 13B, namely, the shield state is held.

Figure 14A:
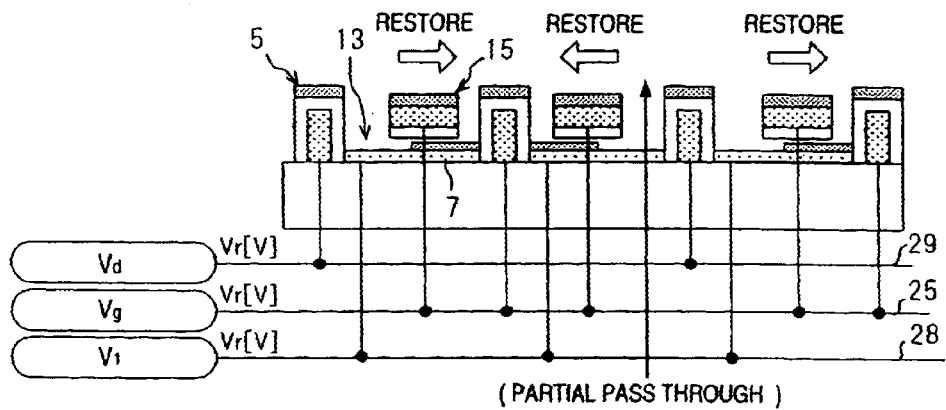
FIGS. 14A to 14C are schematic representations of the operation of the light modulation element shown in FIGS. 12A and 12B.

FIG. 14A shows a state at the write scan time, in which the voltage Vd of the image signal electrode 29 is changed from 0 [V] to Vr [V] in needle release delay time tx after the state in FIG. 13C at the write scan start time, whereby all electrodes are placed in the same potential, the needle 15 is released from the grid wall 5 and is elastically restored in the direction of the neutral state, and the opening part of the light modulation area 13 grows gradually as the needle is moved.

Figure 14B:
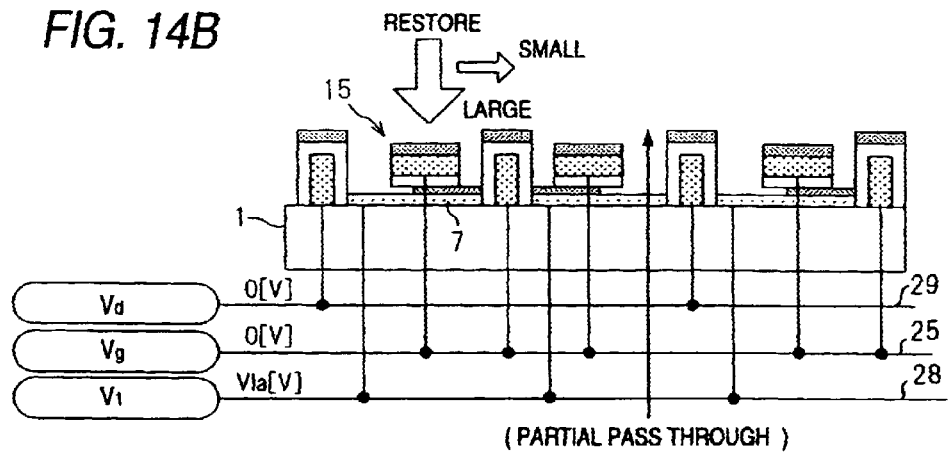

FIG. 14B shows a state at the end of the write scan, in which latch signal voltage V1a [V] is applied to the latch signal electrode 28 and 0 [V] is applied to the scan signal electrode 25 and the image signal electrode 29 for latching. At this time, the voltage V1a [V] is applied between the needle 15 connected to the scan signal electrode 25 and the transparent conductive film 7 on the transparent substrate 1 connected to the latch signal electrode 28. The electrostatic force in the vertical direction produced by the voltage V1a is sufficiently larger than the elastic restoration force of the needle 15 and the needle 15 is attracted to the transparent conductive film 7 and is latched. At this instant, the light transmission factor of the light modulation element is determined. According to this, as the release delay time tx is longer, releasing the needle 15 is delayed and the light transmission factor after latch lessens.

Figure 14C:
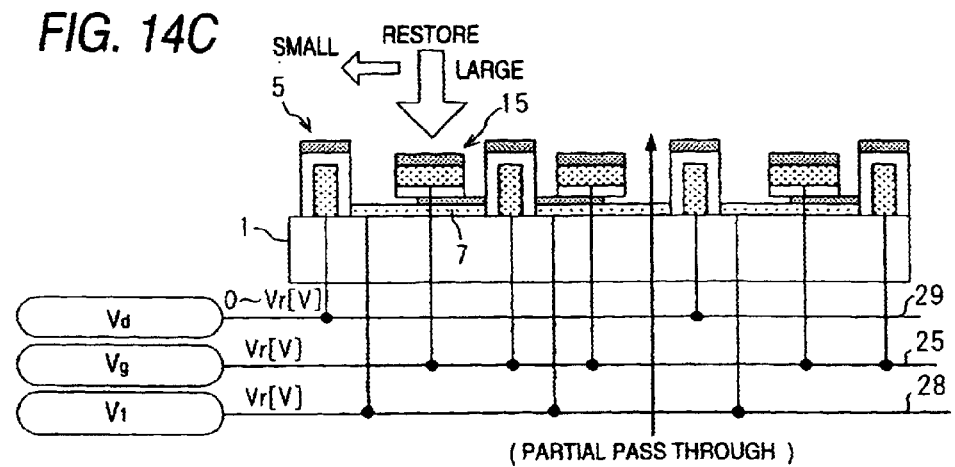

FIG. 14C shows a state at the non-selective scan time, in which a voltage ranging from 0 [V] to Vr [V] is applied to the image signal electrode 29 depending on the write signal voltage of another row. A voltage of 0 [V] is applied to the scan signal electrode 25 and V1a [V] is applied to the latch signal electrode 28. At this time, the voltage V1a [V] is applied between the needle 15 connected to the scan signal electrode 25 and the transparent conductive film 7 on the transparent substrate 1 connected to the latch signal electrode 28. If the electrostatic force in the vertical direction produced by the voltage V1a is sufficiently larger than the elastic restoration force of the needle 15 or the electrostatic suction force to the grid wall 5, the needle 15 holds the state at the write time independently of the value of the image signal voltage Vd (0 to Vr [V]).

If the preset period in which the needle 15 is held at the position at which the needle 15 is forcibly urged is set overlapping the write time of another row, even the light modulation element whose response speed is low can be driven at high speed without wasting the time.

Next, the drive sequence of the light modulation element 35 will be discussed with reference to FIG. 15.

Figure 15:
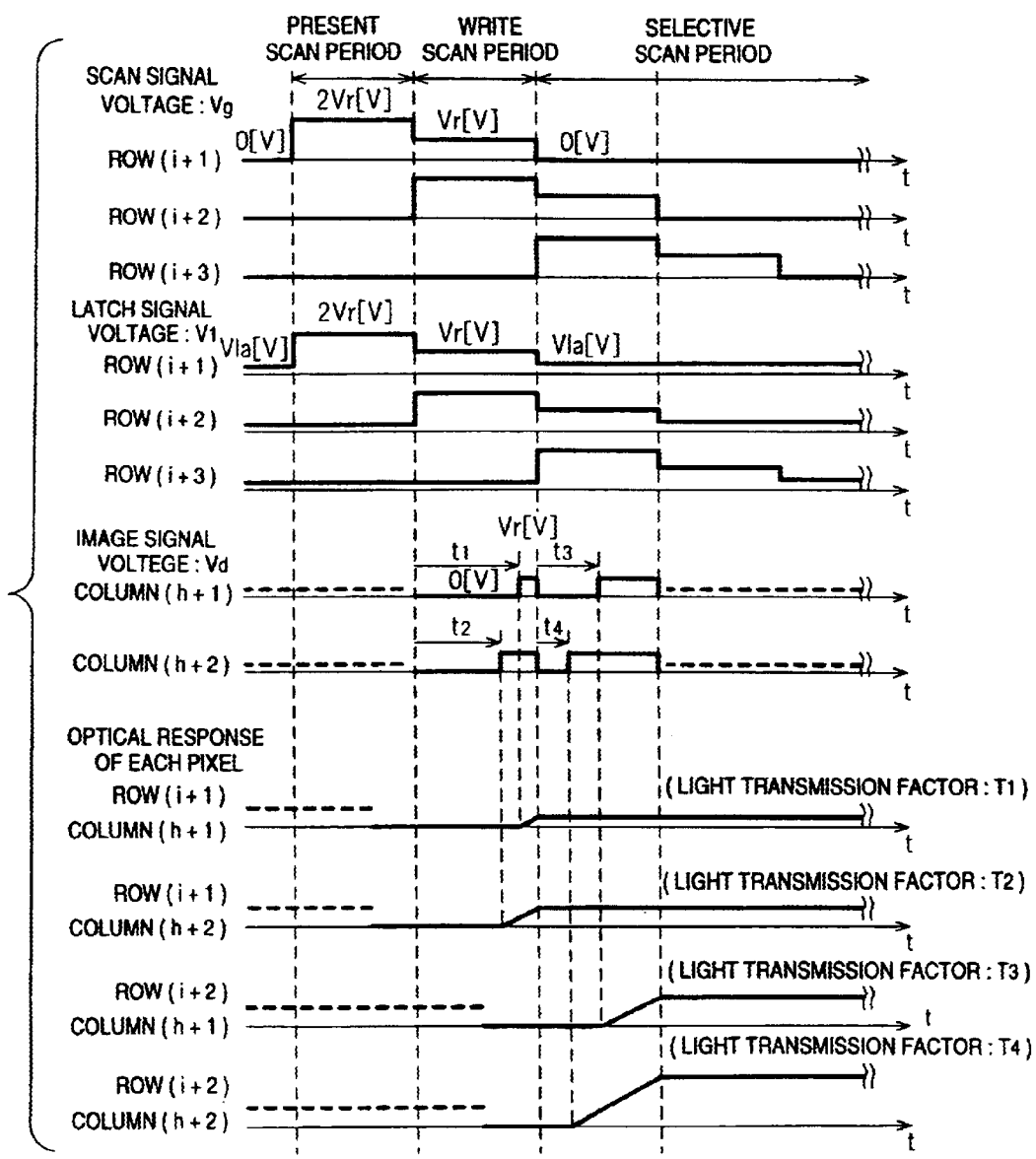
FIG. 15 is a drawing to show a drive sequence example of continuous tone display by PWM of the array-type light modulation element shown in FIG. 11.

FIG. 15 is a drawing to show a drive sequence example of continuous tone display by PWM (pulse width modulation) of the array-type light modulation element shown in FIG. 11. An example of writing the following binary light transmission factor states into pixels will be discussed:

Pixel at row (i+1) column (h+1)→(light transmission factor: T1)

Pixel at row (i+1) column (h+2)→(light transmission factor: T2)

Pixel at row (i+2) column (h+1)→(light transmission factor: T3)

Pixel at row (i+2) column (h+2)→(light transmission factor: T4) where T1<T2<T3<T4.

First, focusing attention on the (i+1)st row, in the preset scan period, voltage 2 Vr [V] is applied to the scan signal electrode 25 and the latch signal electrode 28 and the reset (shield) state is once entered independently of the image signal voltage Vd (0 to Vr [V]).

During the preset scan period, the needle 15 makes the transition to the shield state regardless of the immediately preceding state. Preferably, as shown in FIG. 15, the preset period is set overlapping the write scan period over another row, whereby the redundant time is eliminated and fast write scan is enabled.

Next, in the write scan period, voltage Vr [V] is applied as the scan signal voltage Vg and the latch signal voltage V1 and at the same time, 0 [V] is applied as the image signal voltage Vd. At this time, the light modulation element remains in the shield state.

Then, the image signal Vd is changed from 0 [V] to Vr [V] to column (h+1) after the expiration of the release delay time t1 and to column (h+2) after the expiration of t2, whereby the needles 15 are released from the grid walls 5 with the time difference produced, and start a horizontal move in the direction of the neutral state.

At the write scan end time, the voltage V1a [V] is applied as the latch signal voltage V1 and 0 [V] is applied as the scan signal voltage Vg and the image signal voltage Vd for latching the needle 15. At this time, the light transmission factor of each pixel is determined. In FIG. 15, the light transmission factor of the pixel in the column (h+1) becomes T1 and that of the pixel in the column (h+2) becomes T2.

Next, in the non-selective scan period, only the image signal voltage Vd is changed from 0 to Vr [V], but the state of the needle 15 on the (i+1)st row is held.

In the non-selective scan period, similar drive is executed for the (i+2)nd row with a delay of one write scan period only. In the write scan period, the release delay time tx of the needle in the column (h+1) and that of the needle in the column (h+2) are set to t3 an t4, whereby the light transmission factors after latch can be set to T3 and T4.

Here, the continuous tone drive using PWM will be discussed in detail with reference to FIGS. 16 to 18.

Figure 16A:
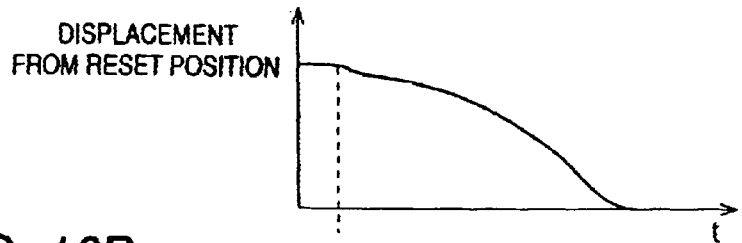
FIGS. 16A and 16B are drawings to show light transmission factor change with respect to the elapsed time since a needle was released.
Figure 16B:
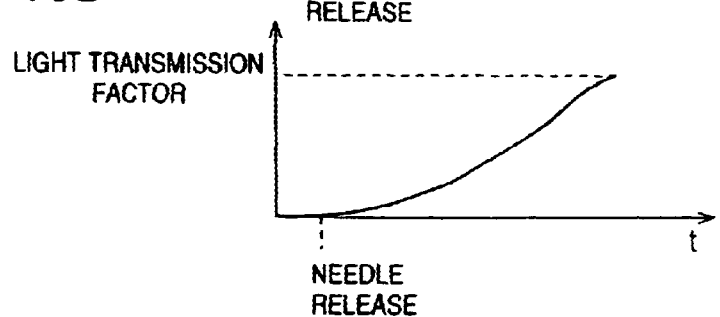
Figure 17:
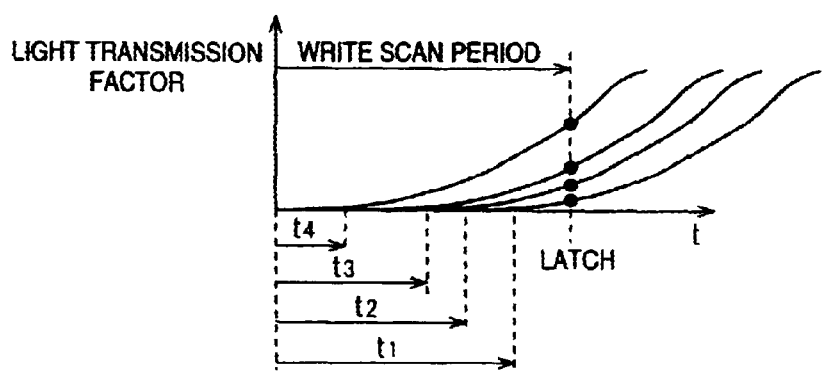
FIG. 17 is a drawing to show the time response characteristic of a light transmission factor with delay time tx from write scan period start to release as a parameter.
Figure 18:
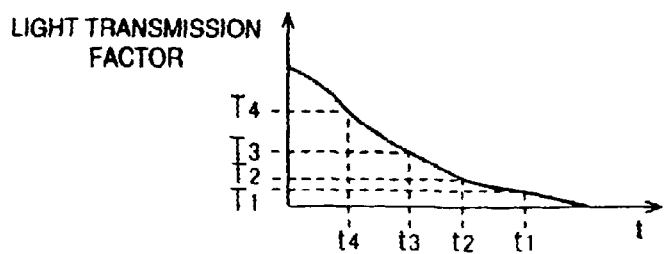
FIG. 18 is a drawing to show the relationship between the delay time tx and the light transmission factor at the latch time in FIG. 17.

FIGS. 16 to 18 show the relationship between the needle release delay time at the write scan time, tx (time from write scan period start to needle release), and the light transmission factor at the latch time.

FIG. 16A shows the elapsed time t when a needle is released from a reset (shield) position and is restored to a neutral position and displacement from the reset position, and FIG. 16B shows time response of light transmission factor. According to FIGS. 16A and 16B, displacement starts at the point in time at which the needle is released, and the light transmission factor rises gradually with the displacement.

FIG. 17 shows the time response characteristic of the light transmission factor with the delay time tx from write scan period start to release as a parameter. For long delay time t1, rising of the light transmission factor is delayed and the light transmission factor at the latch time becomes small; on the other hand, for short delay time t4, the light transmission factor at the latch time becomes large.

FIG. 18 shows the relationship between the delay time tx and the light transmission factor at the latch time in FIG. 17. Release delay times (t1 to t4) corresponding to desired light transmission factors (T1 to T4) are set and PWM control is performed, whereby continuous gradation display is enabled.

In the actual drive sequence, the needle is once reset, then is released, so that the reproducibility of the characteristic described above is good and stable display can be produced.

In the first embodiment, the shield state is entered at the reset time, but in the second embodiment, light is shielded at the preset time, so that contrast is little lowered. Apart from this, a light passing-through state may be entered at the reset time. Since the light passing-through state is entered at the preset time, contrast is lowered, but if the number of scan lines is 500 or more, light leakage caused by preset becomes $\frac{1}{500}$ or less and the contrast lowering degree becomes small.

The example wherein the preset period and the write scan period are set equal has been described so far, but the preset period may be furthermore prolonged (for example, an integral multiple of the write scan period), whereby the reset operation is completed within the preset period and it is made possible to drive even the light modulation element with a long operation time constant at high speed without losing the time.

Figure 8A:
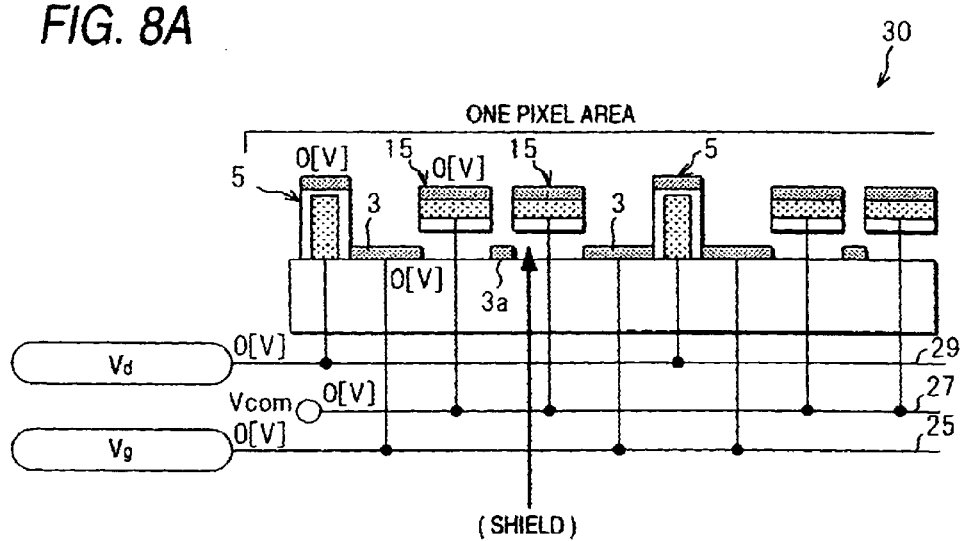
FIGS. 8A and 8B are sectional views of the main part to show the configuration of a light modulation element in a first modified example of the first embodiment.
Figure 8B:
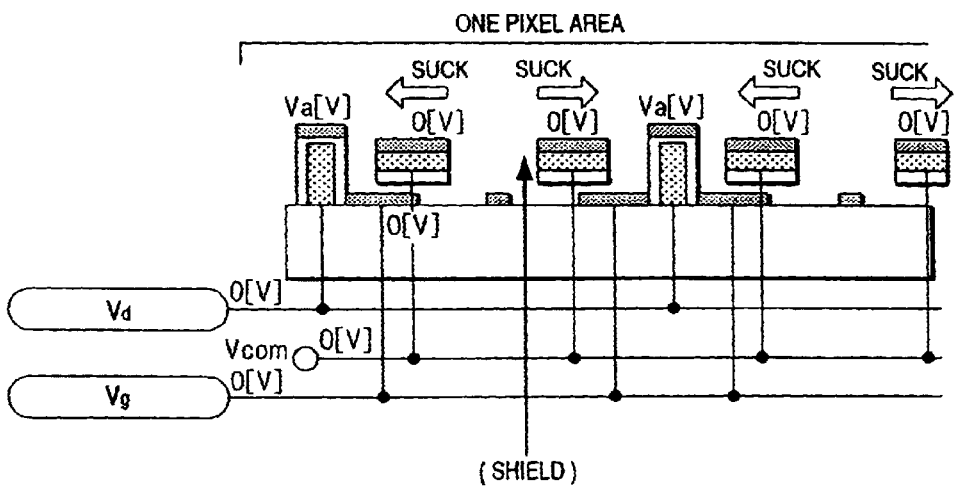

Although the needles 15 and the grid walls 5 are placed alternately, the grid walls 5 connected to the common electrode can be omitted as shown in FIGS. 8A and 8B, whereby the numerical aperture can be enlarged. In this case, the needles are at the same potential and thus can be brought close to each other as much as possible for manufacturing the element.

The applied voltage system to each signal electrode, etc., may be any if the gist of the invention is followed.

As described above, with the light modulation element 35 of the embodiment, any desired light transmission factor can be written into any desired pixel fast and stably. In the non-selection period, it is made possible to stably hold the light transmission factor state at the write time independently of the write contents onto another row. Thus, the needle response speed is raised, whereby the number of scan lines, namely, the number of display lines can be increased and it is made possible to provide a large screen and produce high-contrast display with no crosstalk with other pixels.

In the conventional simple matrix configuration, the memory effect depending on the hysteresis characteristic proper to the element is used to execute matrix drive, but the element design flexibility is lowered in the configuration. However, according to the configuration of the embodiment, stable binary control matrix drive can be executed and continuous tone previously hard to provide can be easily provided based on voltage amplitude change or PWM.

That is, for an array-type light modulation element with 1000 scan lines, for example, in binary display and analog continuous tone, the time required for write scan, Tw, is $$Tw = \frac{1}{1000} \times 60 = 16.7 \ [\mu s]$$

if the field frequency is 60 Hz, and each needle may respond within the Tw time. This is a sufficiently possible range with a margin by selecting the material and shape of the element and the applied voltage thereto appropriately.

On the other hand, to form a simple matrix of a conventional two-dimensional array-type light modulation element basically having only binary stable states, multiple tone drive of dividing a field period into a plurality of weighted subfields for scanning is proposed as means for providing multiple tone. As compared with this case, for example, to provide 256 ($2^8$) levels of gray, the time required for write scan, Tw, is $$Tw = \frac{1}{1000} \times 60 \times 8 = 2.1 \ [\mu s]$$

if the number of scan lines is 1000 and the field frequency is 60 Hz, and it is necessary to more speed up the response of each needle. This means that the element design flexibility lowers.

As compared with an active matrix configuration using semiconductor switches of TFTs, etc., the element structure and the manufacturing process are simpler in the embodiment, so that the costs can be reduced.

Next, a third embodiment of light modulation element according to the invention will be discussed with reference to FIGS. 19 and 20. FIGS. 19A to 19C are schematic representations of the operation of a light modulation element 40 of the third embodiment of the invention. In the embodiment, a needle 15a different in structure from that in the above-described embodiments is moved in the vertical direction of a transparent substrate 1 in FIG. 19 for changing the light transmission factor of the light modulation element and is moved in the horizontal direction and is latched.

As such light modulation executed with the needles moved in the vertical direction, for example, a light modulation system using Fabry-Perot interference can be used. That is, as a needle is moved in the vertical direction, the gap between a transparent substrate and the needle changes and light modulation is executed in response to the gap change.

Figure 19A:
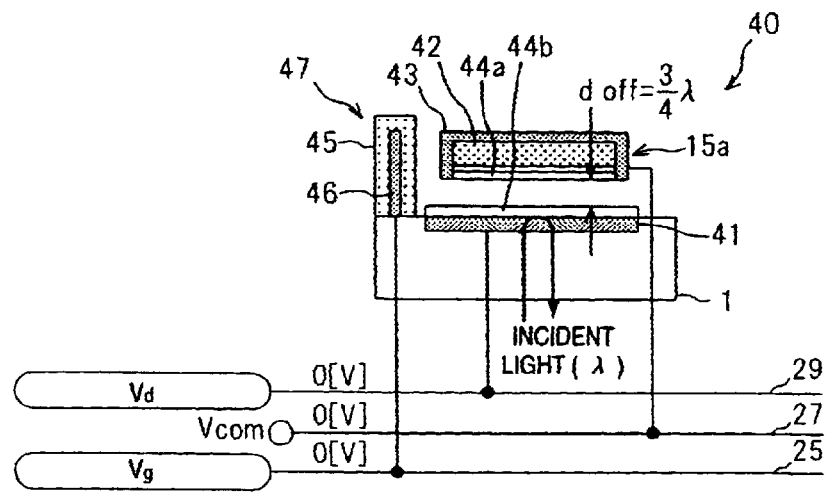
FIGS. 19A to 19C are schematic representations of the operation of a light modulation element of a third embodiment of the invention.
Figure 19B:
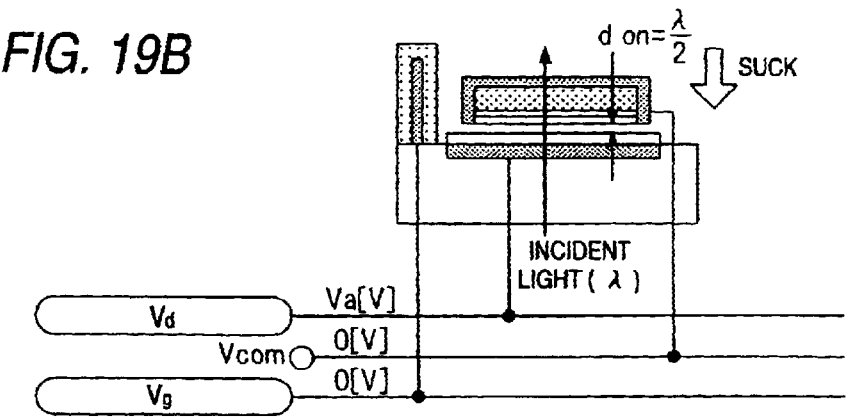
Figure 19C:
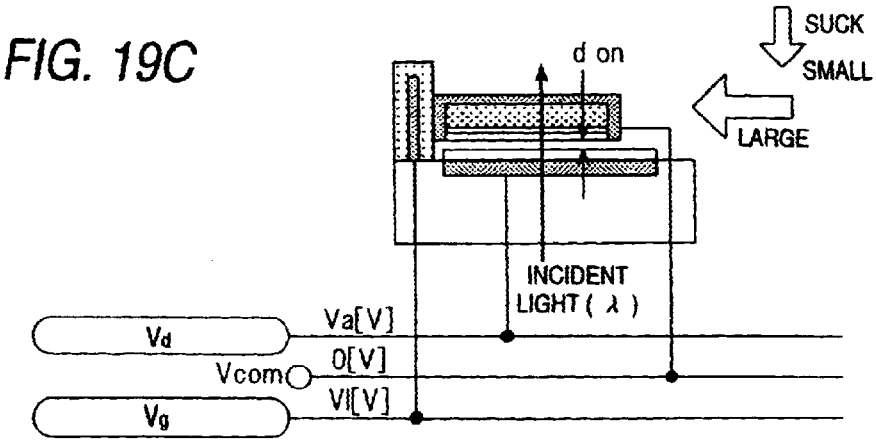

FIGS. 19A to 19C show an example of the light modulation element 40 using the Fabry-Perot interference effect. According to FIGS. 19A to 19C, a transparent substrate 1 is formed with a transparent conductive film 41 and a needle 15a supported movably up and down and from side to side via narrow parts (not shown) above the transparent conductive film 41. The needle 15a is formed with a transparent conductive film 43 surrounding a transparent insulator 42 and is formed on a face on the transparent substrate 1 side with one dielectric mirror 44a. The transparent conductive film 41 is formed on the top face with an opposite dielectric mirror 44b. An electric conductor 46 covered with an insulating film 45 is placed on the transparent substrate 1, forming a grid wall 47.

The electric conductor 46 of the grid wall 47 is connected to a scan signal electrode 25, the transparent conductive film 41 on the transparent substrate 1 is connected to an image signal electrode 29, and the transparent insulator 42 of the needle 15a is connected to a common electrode 27.

According to the described the light modulation element 40, in a neutral state (shield state) shown in FIG. 19A, gap $d_{off}$ for incident light of wavelength λ [nm] is set to 3 λ/4, thus the incident light is reflected.

In the state at the write operation time shown in FIG. 19B, the needle 15a is electrostatically sucked in the vertical direction, whereby gap $d_{on}$ becomes λ/2 [nm], allowing incident light to pass through. With an intermediate gap value, the light transmission factor changes continuously in response to the gap value.

In the embodiment, a spacer (not shown) is placed on the transparent substrate 1 so that the gap d does not become shorter than λ/2 [nm].

Voltage V1 [V] is applied to the scan signal electrode 25 connected to the electric conductor 46 of the grid wall 47 as in a latch state shown in FIG. 19C, whereby the needle 15a is electrostatically sucked to the grid wall 47 and can be latched.

The operation is similar to that in the first embodiment except that the operation direction of the needle 15a is opposite between the vertical and horizontal directions, and the drive method is also similar to that shown in FIGS. 5, 6. Thus, binary display and analog continuous tone display using PWM, etc., can also be produced in a similar manner to that described above.

Further, the gap d in the neutral state may be set to λ [nm] for setting a light passing-through state and the gap d by voltage application between the needle 15a and the transparent conductive film 41 may be set to λ to 3 λ/4 [nm] for setting a shield state, thereby controlling from light passing through to shield.

Figure 20:
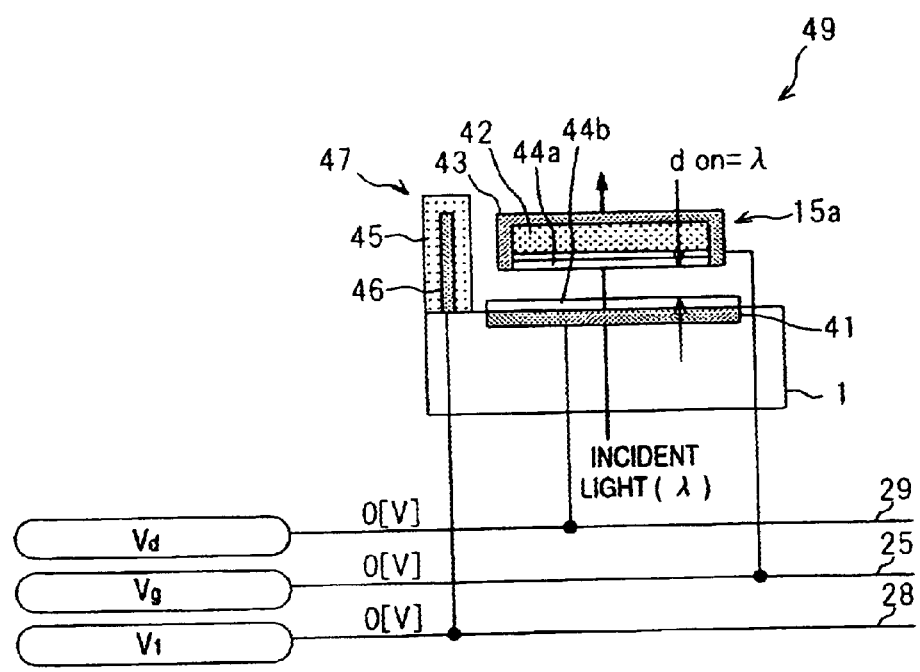
FIG. 20 is a sectional view of the main part of a light modulation element to show a modified example of the third embodiment of the invention.

FIG. 20 is a sectional view of the main part of a light modulation element 49 to show a modified example of the embodiment. In this case, in the neutral state, the maximum light passing-through state is entered in contrast to the case shown in FIGS. 19A to 19C. An electric conductor 42 of a needle 15a is connected to a scan signal electrode 25, an electric conductor 46 of a grid wall 47 is connected to a latch signal electrode 28, and a transparent conductive film 41 is connected to an image signal electrode 29.

If a voltage is applied between the scan signal electrode 25 and the image signal electrode 29, gap d changes from λ [nm] to 3 λ/4 [nm] and the state changes continuously from the maximum passing-through state to shield state.

The operation principle and drive method according to the configuration of the modified example are the same those shown in the second embodiment except that the move direction of the needle is inverted between the vertical and horizontal directions, and therefore will not be discussed again. In this case, any desired continuous tone display using PWM, etc., can also be produced in a similar manner to that described above.

The configuration of the embodiment can also provide similar advantages to those in the first and second embodiments. The response time of the needle, Tw, is 16.7 [µs] providing a margin, the continuous tone is stable as compared with the continuous tone of weighting the field period in a simple matrix in the related art, and active matrix drive for enabling high-speed, high-definition display to be produced can be accomplished in a simple configuration without using TFTs, etc.

Further, in addition to the light modulation element 49 using light interference, a light modulation using the proximity field optical effect that as a needle moves close to light totally reflected and guided on a transparent substrate, the light is coupled to the needle side may be used, and a light modulation element using the diffraction effect may be used.

Thus, even with any optical effect, it is possible to control latching and unlatching as a horizontal move of a needle by a scan signal electrode for light modulation as a vertical move of the needle.

In addition, any structure may be adopted if it is a structure following the gist of the invention wherein each needle is moved separately in at least two different directions. The scan signal electrode, the latch signal electrode, the image signal electrode, the common electrode, etc., and the element structure part may be connected in any combination. Applied voltages to the electrodes may be used in any combination if the gist of the invention is followed.

Next, a fourth embodiment forming a flat-panel display unit using the above-described light modulation elements will be discussed.

Figure 21:
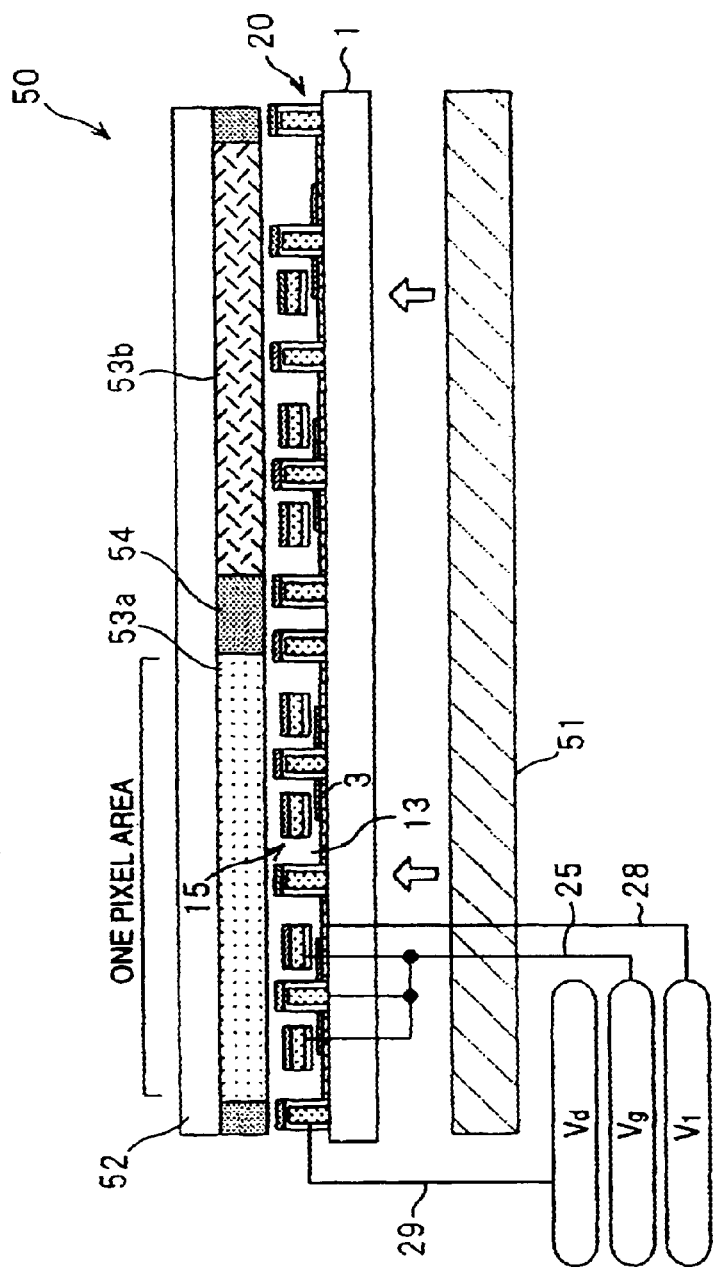
FIG. 21 is a sectional view of the main part of a flat-panel display unit of a fourth embodiment of the invention.

FIG. 21 is a sectional view of the main part of a flat-panel display unit 50 of the embodiment. As light modulation elements of the embodiment, the light modulation elements 20 of the first embodiment are used as an example.

An ultraviolet surface light source 51 used as an ultraviolet output section is disposed on the transparent substrate 1 side of the light modulation elements 20. A front panel 52 is placed above the light modulation elements 20 and fluorescent material 53a, 53b, . . . are provided in a one-to-one correspondence with the light modulation elements on the light modulation element side of the front plate 52. A black matrix 54 is provided between the fluorescent material, improving the contrast of a display image.

According to the configuration of the flat-panel display unit 50 described, light from the ultraviolet surface light source 51 enters the transparent substrate 1 and is guided to the top face of the transparent substrate 1 in the light passing-through mode of the light modulation elements 20. The light from the light modulation elements 20 is applied to the fluorescent material 53a, 53b, . . . , whereby the fluorescent material 53a, 53b, . . . are excited for emitting light, forming any desired image.

As the fluorescent material, fluorescent material of the three primary colors (for example, R, G, and B) may be placed in order for enabling a color image to be displayed or only single-color fluorescent material may be provided for displaying a monochrome image. The front plate is formed of glass, etc., but may be a fiber-like substrate or a diffusion film.

The light modulation elements 20 of the flat-panel display unit 50 may be stabilized by deaerating the space between the transparent substrate 1 and the front panel 52 and then pouring a rare gas for sealing the whole for preventing the effect of disturbance.

Next, the function of the described flat-panel display unit will be discussed.

When the scan signal electrode 25 and the image signal electrode 29 are at the same potential, the needle 15 is positioned overlapping above the light modulation area (opening part) 13 and light from the surface light source is blocked by the needle 15 and the shield-property conductive film 3 and does not pass through to the top face of the transparent substrate 1.

When an image signal voltage is applied to the image signal electrode 29 at the scan time, heteropolar charges with the image signal electrode 29 appear on the conductive film 18, whereby the needle 15 is moved toward the grid wall 5 by the electrostatic suction force acting on the image signal electrode 29 and the conductive film 18. Resultantly, blockage of light by the needle 15 disappears and the light passing through the transparent substrate is emitted from the light modulation area 13. The emitted light excites the corresponding fluorescent material, displaying an image based on image information.

A latch voltage is applied to the latch signal electrode 28 at the end of the scan, whereby the needle 15 is latched to the shield-property conductive film 3 by an electrostatic suction force. Resultantly, when the pixel is not selected, if voltage of another pixel is applied, the transmission factor of the pixel is held intact and active matrix drive is enabled.

Thus, according to the flat-panel display unit 50 of the embodiment, the light emitted from the transparent substrate 1 side is directly applied to the fluorescent material for exciting the same, so that the light use efficiency can be improved. Since the fluorescent material emits scattered light, the viewing angle can be widened as compared with a liquid crystal display for allowing light to pass through by orientation control of liquid crystal molecules. Further, the fluorescent material can be easily put into an array, thus the manufacturing costs can be reduced. Since the needle 15 can be driven by the electromechanical operation, the drive voltage can be made low as compared with a plasma display, etc.; the drive voltage can also be made low by using a low elastic material, for example, a high polymer of polyimide, etc., as the material of the needle 15 or optimizing the shape of the needle 15.

As the light modulation elements of the embodiment, the light modulation elements 20 of the first embodiment are used as an example. However, the light modulation elements used with the flat-panel display unit 50 of the fourth embodiment are not limited to the light modulation elements 20; the light modulation elements 30, 35, 40 of the second and third embodiments can also be applied to the flat-panel display unit 50 of the fourth embodiment.

As described above, with the light modulation element and the array-type light modulation element according to the invention, the light modulation operation is performed by the first electromechanical force and the displacement state of the needle can be held or canceled in response to the second electromechanical force generated by the drive means. Thus, a memory property can be provided for the light transmission factor of the light modulation element and the element structure enabling active matrix drive can be provided.

The array-type light modulation element comprises a plurality of parallel scan signal electrodes, a plurality of image signal electrodes orthogonal to the scan signal electrodes, and light modulation elements being placed at intersection points of the scan signal electrodes and the image signal electrodes, so that the displacement state of each needle is held or canceled by the signal of the scan signal electrode and the displacement state of each needle is changed by the signal of the image signal electrode. Further, latch signal electrodes are provided, whereby the displacement state of each needle is held or canceled by the signal of the latch signal electrode, thus highly efficient and stable drive is enabled.

In the array-type light modulation element drive method according to the invention, the applied voltage or the voltage application timing is controlled, whereby the move distance of the needle can be changed and the light transmission factor of the light modulation element can be changed as desired. Thus, the modulated light by the light modulation element can be changed as binary gradation or in an analog manner for providing multiple levels of gray. The move state of the needle is held, whereby gradation can be provided with a memory property and active matrix drive can be provided.

Since the flat-panel display unit uses the electrostatically driven light modulation elements, the light use efficiency can be improved and the viewing angle can be widened as compared with a liquid crystal display; moreover, the light modulation elements can be easily put into an array, thus the manufacturing costs can be reduced. Since the needle can be driven by the electromechanical operation, the drive voltage can be lowered. In addition, efficient matrix drive is enabled, so that high image quality can also be provided in a moving picture and matrix drive capable of performing the operation at high speed and producing high-contrast display is enabled.

What is claimed is:

1. A light modulation element for performing electromechanical operation of generating a first electromechanical force for a needle for displacing the needle, thereby changing a transmission factor of light, said light modulation element comprising:

drive means for generating or canceling a second electromechanical force for the needle in a direction different from that of the first electromechanical force so as to hold or cancel the displacement state of the needle, wherein the directions of the first and second electromechanical forces are substantially orthogonal to each other;

wherein the directions of the first and second electromechanical forces are selected from the group consisting of the direction of the first electromechanical force is substantially horizontal and the direction of the second electromechanical force is substantially vertical, and the direction of the first electromechanical force is substantially vertical and the direction of the second electromechanical force is substantially horizontal.

2. The light modulation element as claimed in claim 1 wherein each of the first and second electromechanical forces is an electrostatic force produced by an electric field.

3. The light modulation element as claimed in claim 1 wherein each of the first and second electromechanical forces is an electromagnetic force.

4. The light modulation element as claimed in claim 1 wherein each of the first and second electromechanical forces is a force produced by an electrostrictive strain effect.

5. The light modulation element as claimed in any one of claims 1 to 4 comprising a needle being partially supported on the side of a substrate and having electric conductivity and a first fixed electrode and a second fixed electrode being placed facing the needle, wherein the needle is displaced substantially horizontally with respect to the substrate based on a potential difference caused by voltage application to the first fixed electrode and the needle, thereby changing the light transmission factor and wherein the displacement state of the needle is held or canceled by voltage application to the second fixed electrode and the needle.

6. The light modulation element as claimed in any one of claims 1 to 4 comprising a needle being partially supported on the side of a substrate and having electric conductivity and a first fixed electrode and a second fixed electrode being placed facing the needle, wherein the needle is displaced substantially vertically with respect to the substrate based on a potential difference caused by voltage application to the first fixed electrode and the needle, thereby changing a light modulation factor and wherein the displacement state of the needle is held or canceled by voltage application to the second fixed electrode and the needle.

7. The light modulation element as claimed in any one of claims 1 to 4 wherein the needle has a shield property and is placed in an intermediate point on a light path and the light shield amount in the light path is changed by displacement of the needle.

8. The light modulation element as claimed in any one of claims 1 to 4 wherein the light transmission factor of said light modulation element is changed based on any of interference effect, the proximity field optical effect, diffraction effect, or light deflection effect produced as the needle is displaced.

9. The light modulation element as claimed in any one of claims 1 to 4 comprising:
a needle partially being supported on a transparent substrate transparent for light to be modulated and having a shield property and electric conductivity;
a first fixed electrode being opposed to a first direction of the needle and provided like a wall on a plane perpendicular to the transparent substrate;
a second fixed electrode being opposed to a second direction of the needle and provided on a plane parallel to the transparent substrate; and
a shield film being formed with an opening left as a light modulation area, wherein
the needle is moved in the first direction by an electrostatic force produced by voltage application to the needle and the first fixed electrode, thereby executing light modulation and wherein the needle is sucked or attracted in the second direction by voltage application to the needle and the second fixed electrode for holding the displacement state of the needle or the electrostatic force is canceled for canceling the displacement state.

10. The light modulation element as claimed in claim 9 wherein a plurality of the needles and a plurality of the first fixed electrodes are disposed like a grid.

11. An array-type light modulation element as claimed in claim 1 comprising:
a plurality of parallel scan signal electrodes;
a plurality of image signal electrodes orthogonal to the scan signal electrodes; and
the light modulation elements being placed at intersection points of the scan signal electrodes and the image signal electrodes, wherein;
the displacement state of each needle is held or canceled by a signal of the scan signal electrode and the displacement state of each needle is changed by a signal of the image signal electrode.

12. An array-type light modulation element in claim 1 comprising:
a plurality of parallel scan signal electrodes;
a plurality of latch signal electrodes being placed side by side with the scan signal electrodes;
a plurality of image signal electrodes orthogonal to the scan signal electrodes and the latch signal electrodes; and
light modulation elements being placed at intersection points of the scan signal electrodes and the latch signal electrodes and the image signal electrodes, wherein;
the displacement state of each needle is held or canceled by signals of the scan signal electrode and the latch signal electrode and the displacement state of each needle is changed by a signal of the image signal electrode.

13. The array-type light modulation element as claimed in any one of claims 11 to 12, wherein the light modulation element is in a shield state when the needle does not operate and wherein a light transmission factor increases as the needle is displaced from the shield state by an electrostatic force.

14. The array-type light modulation element as claimed in any one of claims 11 to 12, wherein the light modulation element is in a light passing-through state when the needle does not operate and wherein a light transmission factor decreases as the needle is displaced by an electrostatic force.

15. A flat-panel display unit as claimed in any one of claims 11 to 12, comprising:
the array-type light modulation element;
a surface light source being placed facing the array-type light modulation element; and
fluorescent material being placed on an opposite side to the surface light source with the array-type light modulation element between, wherein;
light passing through the array-type light modulation element causes the fluorescent material to emit light for producing display.

16. The flat-panel display unit as claimed in claim 15, wherein the light emitted from the light source is ultraviolet light.

17. A drive method of an array-type light modulation element for performing electromechanical operation of generating a first electromechanical force for a needle for displacing the needle, thereby changing a transmission factor of light, said light modulation element comprising:
drive means for generating or canceling a second electromechanical force for the needle in a direction different from that of the first electromechanical force so as to hold or cancel the displacement state of the needle;
a plurality of parallel scan signal electrodes;
a plurality of image signal electrodes orthogonal to the scan signal electrodes; and
light modulation elements being placed at intersection points of the scan signal electrodes and the image signal electrodes;
wherein the displacement state of each needle is held or canceled by a signal of the scan signal electrode and the displacement state of each needle is changed by a signal of the image signal electrode,
said method comprising the steps of:
in a write scan period of the light modulation element, canceling holding the needle by a scan signal or a scan signal and a latch signal and displacing the needle to any desired position by an image signal; and in a non-write scan period, holding the displacement state of the needle by a scan signal or a scan signal and a latch signal.

18. The array-type light modulation element drive method as claimed in claim 17 wherein the needle is binary-driven with two positions as displacement destinations.

19. The array-type light modulation element drive method as claimed in claim 17 wherein the needle is driven for providing multiple levels of gray with any desired positions as displacement destinations.

20. The array-type light modulation element drive method as claimed in claim 19, wherein the move distance of the needle is set in response to the voltage application time to the image signal.

21. The array-type light modulation element drive method as claimed in claim 20, wherein the needle is held at a position where the needle is elastically urged at the write scan start time over the light modulation element, wherein holding the needle is canceled after the expiration of an arbitrary time, and wherein the needle is again held at the termination of the write scan.

22. The array-type light modulation element drive method as claimed in claim 21 wherein the period during which the needle is held at the position where the needle is elastically urged is set overlapping a write scan period over another row.

23. The array-type light modulation element drive method as claimed in claim 17, wherein the move distance of the needle is set in response to a voltage level applied to the image signal.

24. The array-type light modulation element drive method as claimed in claim 23, wherein the needle is driven at displacement response speed responsive to the voltage level applied to the image signal.

25. A light modulation element for performing electromechanical operation of generating a first electromechanical force for a needle for displacing the needle, thereby changing a transmission factor of light, said light modulation element comprising:

a drive element which generates or cancels a second electromechanical force for the needle in a direction different from that of the first electromechanical force so as to hold or cancel the displacement state of the needle, wherein the directions of the first and second electromechanical forces are substantially orthogonal to each other;

wherein the directions of the first and second electromechanical forces are selected from the group consisting of the direction of the first electromechanical force is substantially horizontal and the direction of the second electromechanical force is substantially vertical, and the direction of the first electromechanical force is substantially vertical and the direction of the second electromechanical force is substantially horizontal.

26. A drive method of an array-type light modulation element for performing electromechanical operation of generating a first electromechanical force for a needle for displacing the needle, thereby changing a transmission factor of light, said light modulation element comprising:

drive means for generating or canceling a second electromechanical force for the needle in a direction different from that of the first electromechanical force so as to hold or cancel the displacement state of the needle;

a plurality of parallel scan signal electrodes;

a plurality of latch signal electrodes being placed side by side with the scan signal electrodes;

a plurality of image signal electrodes orthogonal to the scan signal electrodes and the latch signal electrodes; and light modulation elements being placed at intersection points of the scan signal electrodes and the latch signal electrodes and the image signal electrodes;

wherein the displacement state of each needle is held or canceled by signals of the scan signal electrode and the latch signal electrode and the displacement state of each needle is changed by a signal of the image signal electrode, said method comprising the steps of:

in a write scan period of the light modulation element, canceling holding the needle by a scan signal or a scan signal and a latch signal and displacing the needle to any desired position by an image signal; and in a non-write scan period, holding the displacement state of the needle by a scan signal or a scan signal and a latch signal.

\* \* \* \* \*